US012773684B2

(12) United States Patent
Hart et al.

(10) Patent No.: US 12,773,684 B2
(45) Date of Patent: Oct. 27, 2026

(54) SILICA-BASED GRANULAR MEDIA

(71) Applicant: The Curators of the University of Missouri, Columbia, MO (US)

(72) Inventors: Megan Hart, Kansas City, MO (US); Hannah McIntyre, Kansas City, MO (US)

(73) Assignee: The Curators of the University of Missouri, Columbia, MO (US)

( * ) Notice: Subject to any disclaimer, the term of this patent is extended or adjusted under 35 U.S.C. 154(b) by 620 days.

(21) Appl. No.: 18/037,143

(22) PCT Filed: Nov. 16, 2021

(86) PCT No.: PCT/US2021/059504
§ 371 (c)(1),
(2) Date: May 16, 2023

(87) PCT Pub. No.: WO2022/104255
PCT Pub. Date: May 19, 2022

(65) Prior Publication Data

US 2024/0001340 A1 Jan. 4, 2024

Related U.S. Application Data

(60) Provisional application No. 63/114,291, filed on Nov. 16, 2020.

(51) Int. Cl.

| | |
|---|---|
| ***B01J 21/00*** | (2006.01) |
| ***B01J 21/06*** | (2006.01) |
| ***B01J 21/08*** | (2006.01) |
| ***B01J 35/39*** | (2024.01) |
| ***B01J 35/64*** | (2024.01) |
| ***B01J 37/34*** | (2006.01) |

(52) U.S. Cl.
CPC ............. *B01J 21/08* (2013.01); *B01J 21/063* (2013.01); *B01J 35/39* (2024.01); *B01J 35/657* (2024.01); *B01J 37/345* (2013.01)

(58) Field of Classification Search
None
See application file for complete search history.

(56) References Cited

U.S. PATENT DOCUMENTS 5,501,801 A 3/1996 Zhang et al.
2004/0202602 A1* 10/2004 Masa-Aki ........... H01M 4/8605 423/445 R (Continued)

OTHER PUBLICATIONS

Nishikiori et al, Formation of silica nanolayer on titania surface by photocatalytic reaction, applied catalysis B: enviromental, 241, 299-304 (Year: 2019).*

(Continued)

*Primary Examiner* — Stefanie J Cohen
(74) *Attorney, Agent, or Firm* — Stinson LLP

(57) ABSTRACT

The present disclosure relates to a photocatalytic silica-based granular media for degrading organic compounds formed from a three-dimensional polymer and comprising cross-linked silicon-oxygen bonds, wherein the media comprises a distribution of pore space. The present disclosure also relates to a process for producing the granular media, a method of using the granular media to degrade one or more organic compounds, and a reactor using the granular media.

20 Claims, 35 Drawing Sheets

(56) References Cited

U.S. PATENT DOCUMENTS

| | | | |
|---|---|---|---|
| 2006/0014050 A1 | 1/2006 | Gueneau et al. | |
| 2010/0135864 A1 | 6/2010 | Taniguchi et al. | |
| 2011/0045965 A1 | 2/2011 | Ryu | |
| 2011/0245576 A1 | 10/2011 | Keller-Spitzer et al. | |
| 2018/0185821 A1* | 7/2018 | Miyamoto | C01B 33/159 |
| 2019/0001308 A1 | 1/2019 | Pasternak et al. | |
| 2020/0139304 A1 | 5/2020 | Saha et al. | |

OTHER PUBLICATIONS

International Search Report and Written Opinion dated Mar. 16, 2022 related to PCT/US2021/059504, 21 pages.

European Extended Search Report issued by the European Patent Office for European Application No. 21893016.2, mailed Sep. 23, 2025, 10 pages.

Joshi, et al., "Efficient photocatalytic hydrogen generation by silica supported and platinum promoted titanium dioxide", Materials Research Bulletin, Elsevier, Kidlington, GB, vol. 48, No. 9, May 23, 2013 (May 23, 2013), pp. 3545-3552, XP028575115, ISSN: 0025-5408, DOI: 10.1016/J.MATERRESBULL.2013.05.057 2 Experimental; figures; tables; compounds.

Joshi, et al., "Silica Gel Supported Titanium Dioxide Photocatalyst for Methyl Orange Photoreduction", International Journal of Knowledge Engineering, vol. 3, No. 1, Jan. 1, 2012 (Jan. 1, 2012), pp. 137-137, XP093310060, ISSN: 0976-5824 Experimental.

* cited by examiner

SILICA-BASED GRANULAR MEDIA

CROSS REFERENCE TO RELATED APPLICATIONS

This application claims the benefit of U.S. Provisional Application No. 63/114,291 filed Nov. 16, 2020, the contents of which are incorporated by reference in their entirety.

STATEMENT REGARDING FEDERALLY SPONSORED RESEARCH OR DEVELOPMENT

None.

FIELD

The present disclosure relates to silica-based granular media, a process for producing the same, and a method of degrading organic compounds using the silica-based granular media, as well as reactors employing the silica-based granular media.

BACKGROUND

Due to the ubiquitous and harmful presence of per- and polyfluoroalkyl substances (PFASs) in the environment, these compounds have been designated as emerging contaminants of concern. Utilization in various applications from Teflon production to firefighting foams has led to widespread contamination. PFASs are extremely resistant to degradation, bioaccumulative, and persistent once they enter into the environment. As a result, bioaccumulation and rapid uptake occurs within food chains. Primary exposure pathways for people include drinking water sources, fish consumption, and food packaging, with perfluorooctane sulfonate (PFOS) being one of the main concerns for human exposure. Such exposure can cause chronic health impacts and inhibit child development.

Prior treatment techniques removed most PFASs from ground water using pump-and-treat systems such as IX or granular activated carbon (GAC) treatment. One of the primary drawbacks of IX and GAC is the need to dispose of the regenerant solutions containing concentrated PFASs. Currently, spent GAC or IX resin materials produced at groundwater remediation sites must be transported off-site and typically hauled long distances to licensed facilities for disposal or regeneration. Regeneration of IX resins has been known to produce, on average, five bed volumes of concentrated PFAS solutions, proprietary solvents, and brines per 1,000 beds of volume treatment. This large volume of highly concentrated solution is typically further concentrated, followed by incineration. Incineration methods can produce undesirable by-products and smaller-chained PFASs. If complete mineralization and defluorination is not achieved, toxic shorter-chain PFASs can form as by-products, which are typically harder to treat and more mobile in the environment.

Although incineration is the primary mechanism for destruction of PFASs in concentrated waste streams, additional destructive technologies have been documented. Advanced chemical oxidation using hydroxyl radical-based chemistry, which is typically employed to degrade persistent organic chemicals, is reported to be inefficient for PFASs, as the C—F bonds resist complete reduction. Adsorption using activated carbon, photocatalysis, photolysis, thermolysis, and other promising technologies have been proposed but are either minimally effective in removing short-chained perfluoroalkyl acids (PFAAs) or are energy-intensive, requiring high temperatures or pressures that are difficult to implement in the field.

Advanced oxidation processes for destruction of PFASs have been developed to systematically target PFAS degradation. However, the techniques shown in this field lack the ability to completely mineralize PFASs or are difficult to implement in the field at large capacities. The major drawback of photocatalytic slurries is the need to filter out the photocatalyst after treatment for recovery and reuse. Salts present in groundwater or concentrated wastes can also inhibit the capabilities of the photocatalysts, and any amount of turbidity impacts activation of the photocatalyst.

Degradation initiated by nucleophiles has been shown to completely mineralize PFASs with almost complete recovery of aqueous fluoride. The ability to upscale these treatment technologies to continuously treat large quantities of concentrated waste is very limited due to the high energy required for defluorination and the extended contact time necessary to fully treat solution at less extreme conditions.

There is currently a need for a non-thermal, destructive, practical and cost-effective technology that are scalable, cost-effective and low-energy, and can easily be commercialized to degrade (e.g., mineralize) PFASs present in concentrated liquid waste streams, including legacy aqueous film forming foam (AFFF), ion exchange (IX) resin regenerant, landfill leachate, industrial wastewater, and more.

SUMMARY

One aspect of the present disclosure is a photocatalytic silica-based granular media for degrading organic compounds formed from a three-dimensional polymer and comprising cross-linked silicon-oxygen (Si—O—Si) bonds formed through hydrolysis of an alkoxide precursor and a photocatalyst, wherein the media comprises a distribution of pore spaces.

Also provided herein is a process for producing a photocatalytic silica-based granular media, the process comprising introducing a photocatalyst to an alkoxide precursor with heat and/or agitation to form a photocatalyst mixture, hydrolyzing and condensing the photocatalyst mixture until a polymer gel is formed, removing excess solution to fuse the gel into a granular media, and adding a foaming agent to create a distribution of internal pore space within the granular media.

A further aspect of the present disclosure is a method for degrading one or more organic compounds, the method comprising introducing the one or more organic compounds to the silica-based granular media and irradiating the compound with electromagnetic radiation, preferably UV radiation.

Another aspect of the present disclosure is a reactor to degrade a composition comprising one or more organic compounds, the reactor comprising an inlet to allow the passage of an incoming stream containing the one or more organic compounds, at least one media area, wherein the media area is packed with the silica-based granular media, at least one UV light source exposed to a treatment area, and an outlet to allow the passage of an outgoing waste stream at least partially depleted of the one or more organic compounds.

Other objects and features will be in part apparent and in part pointed out hereinafter.

DESCRIPTION OF THE DRAWINGS

Corresponding reference characters indicate corresponding parts throughout the drawings.

DETAILED DESCRIPTION

Figure 1A:
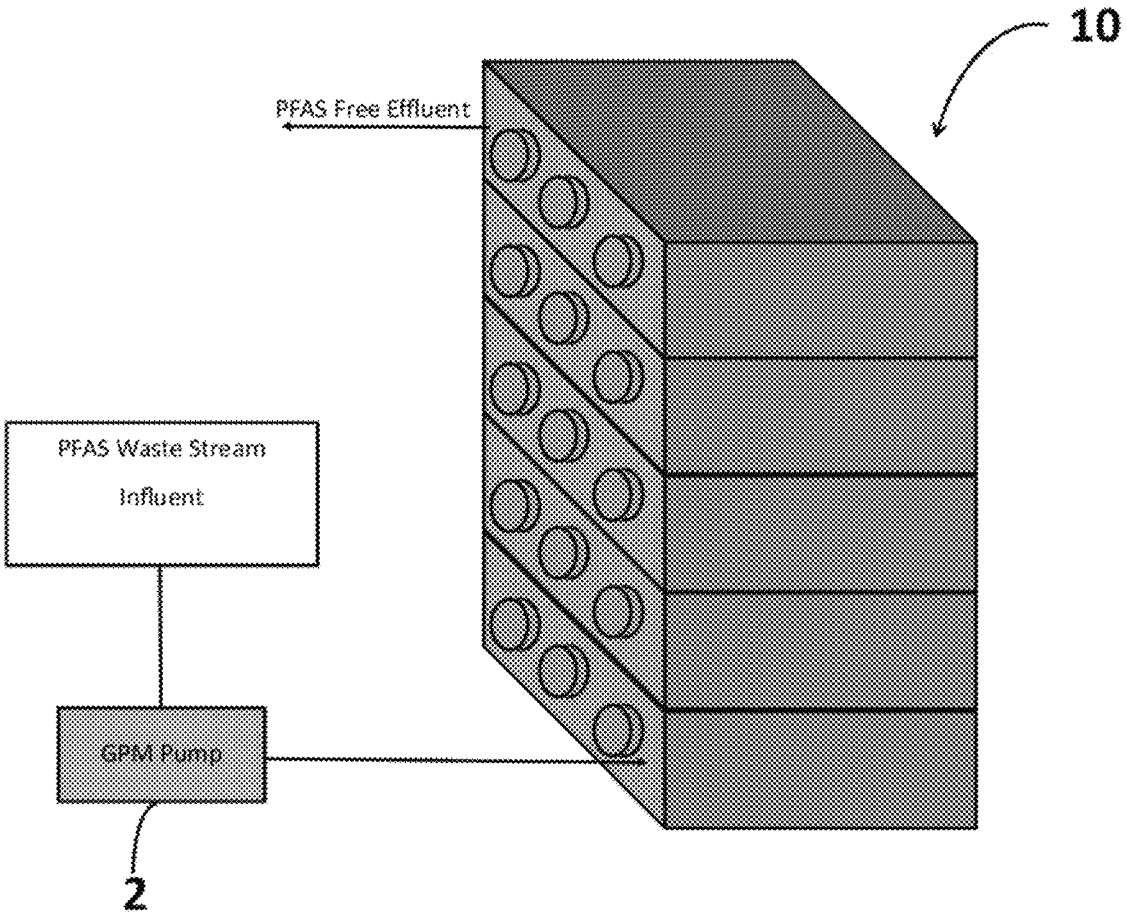
FIG. 1A shows a perspective view of a continuous reactor using the silica-based granular media (SGM).

The present disclosure seeks to combine advanced oxidation processes with nucleophilic attack. In particular, a photocatalytic porous silica-based granular media (SGM) is described herein. The SGM is capable of combining both photocatalytic and nucleophilic treatment processes and can be utilized in a packed-bed column system for continuous, passive treatment. The photocatalyst is immobilized in the media, and preloaded nucleophiles may be diffused from within the pore space. The high porosity of the media allows the PFAS degradation products to enter the SGM while filtering out turbidity without creating fouling on the surface. The resultant media is cost-effective, has a low energy consumption, can be scaled to fit the volume needed, and requires no pre- or post-treatment of the waste stream.

Silica-Based Granular Media

One aspect of the present disclosure is directed to a photocatalytic silica-based granular media (SGM). The granular media is typically useful in applications requiring the degradation of organic compounds. The media is formed from a three-dimensional polymer and comprises cross-linked silicon-oxygen bonds (i.e., Si—O—Si bonds). The silicon-oxygen bonds are formed through hydrolysis of an alkoxide precursor and a photocatalyst. The cross-linked polymer structure of the media immobilizes the photocatalyst. A foaming agent can be added, and the three-dimensional polymer can then be fired (for example, from about 200° C. to about 600° C.) to form the granular media. The media generally includes a distribution of pore spaces.

The SGM contains properties similar to lightweight aggregate in terms of density, absorption, and strength. The cross-linked polymer structure allows for the development of micro and meso pore space within the SGM. The pore space can aid the photocatalytic degradation of organic compounds by diffusing out preloaded electrophiles, nucleophiles, or salts when in contact with a liquid waste stream.

The resulting granular media typically contains a distribution of pore spaces. For example, the granular media can have a porosity of at least about 30%, at least about 40%, at least about 50%, at least about 60%, at least about 70% or more. Preferably, the granular media has a porosity of at least about 40%. In various embodiments, the granular media has a porosity of from about 30% to about 90%, from about 40% to about 90%, from about 30% to about 70%, from about 40% to about 60%, or from about 40% to about 50%. Preferably, the granular media has a porosity of from about 40% to about 60%. The fired media generally has a tortuosity of at least about 0.5, or from about 0.5 to about 2.0. In preferred embodiments, the granular media has a tortuosity of from about 0.8 to about 1.5. The media can have an overall size distribution of from about 1 mm to about 30 mm. Additionally, the media can have an internal pore size distribution of from about 100 nm to about 50,000 nm.

The alkoxide precursor can comprise, for example, a silica-containing alkoxide precursor. In other embodiments, the alkoxide precursor does not contain silica. In various embodiments, the alkoxide precursor comprises tetraethyl orthosilicate (TEOS), tetramethyl orthosilicate (TMOS), titanium isopropoxide (TTIP), or a combination thereof. Preferably, and especially when the alkoxide precursor does not contain silica, silicic acid, or another form of silica, also contributes to the Si—O—Si bonds, alone or in combination with the alkoxide precursor, such that at least a portion of the silica present within the silicon-oxygen bonds is provided by silicic acid or another form of silica independent of the alkoxide precursor. In embodiments that do not contain a silica-containing alkoxide precursor, silicic acid, or another form of silica (e.g., silica fumes, colloidal silica, and the like), is required in order to form the Si—O—Si bonds.

The photocatalyst can comprise, for example, a metal oxide. The metal oxide can comprise $TiO_2$, $Ti_nO_{2n}$, wherein n is an integer from 1 to 10. $Bi_2O_3$, $BiPO_4$, $In_2O_3$, $Ga_2O_3$, $Sb_2O_3$, ZnO, or a combination thereof. The photocatalyst can be combined with a dopant comprising, for example, Au, Ag, Al, C, Pt, Si, W, or any combination thereof.

Optionally, the pores of the SGM can include a surface charge, which can be achieved by an acidic or basic rinse through the addition of, for example, water, nitric acid, sulfuric acid, sodium hydroxide, potassium hydroxide, or a combination thereof. The media may optionally be treated by loading the pores of the media with amendments comprising nucleophiles, electrophiles, salts, or a combination thereof, for example nitric acid, sulfuric acid, hydrochloric acid, potassium hydroxide, sodium hydroxide, calcium hydroxide, sodium thiosulfate, or a combination thereof. It will be understood by the skilled person that loading the pores does not require that all pores be loaded. As will be further understood by the skilled person, the overall surface charge of the media is particularly important when the media is used to degrade certain PFAS compounds. As specific examples, perfluorosulfonic acids and perfluoroalkyl acid precursors degrade under basic and acidic amendments and as such, the amendments preferably comprise nitric acid, sulfuric acid, hydrochloric acid, sodium thiosulfate, potassium hydroxide, sodium hydroxide, or a combination thereof. In contrast, perfluorocarboxylic acids degrade under acidic amendments and as such, the amendments preferably comprise sulfuric acid, nitric acid, hydrochloric acid, or a combination thereof.

Process of Producing a Silica-Based Granular Media

Also provided herein is a process for producing a photocatalytic silica-based granular media. The process generally comprises introducing a photocatalyst to an alkoxide precursor with heat and/or agitation to form a photocatalyst mixture, hydrolyzing and condensing the photocatalytic mixture until a polymer gel is formed, adding a foaming agent to create internal pore space in the media, and removing excess solution to fuse the gel into a granular media.

Thus, the novel SGM technology described herein develops a porous structure through a cross-linked matrix obtained through the hydrolysis and condensation processes. Three-dimensional cross-links are retained in the polymer structure through the introduction of a foaming agent.

The photocatalyst and alkoxide precursor are introduced, preferably with heat and/or agitation, which leads to the hydrolysis/condensation reaction. Thus, as will be readily understood by one of ordinary skill in the art, the hydrolyzing and condensing step will overlap with the introduction step. The introduction step combines the photocatalyst and alkoxide precursor. The heat and/or agitation can be provided, for example, by introducing a heat source and heating the mixture to from about 20° C. to about 110° C. and/or stirring the mixture at a range of from about 10 rpm to about 800 rpm.

The alkoxide precursor can comprise, for example, a silica-containing alkoxide precursor. In various embodiments, the alkoxide precursor comprises tetraethyl orthosilicate (TEOS), tetramethyl orthosilicate (TMOS), titanium isopropoxide (TTIP), or a combination thereof. Preferably, silicic acid, or another form of silica, is also included in the introducing step, along with the alkoxide precursor and photocatalyst. In embodiments that do not contain a silica-containing alkoxide precursor, silicic acid, or another form of silica, is required in order to form the Si—O—Si bonds. The silicic acid or other form or silica is utilized as a weak acid catalyst to favor the forward hydrolysis/condensation reaction.

The photocatalyst can be introduced to the alkoxide precursor in the form of a solid or in solution with the solvent. The solution can contain the photocatalyst in a dissolved, colloidal, or suspended state. As non-limiting examples, the solvent can comprise methanol, ethanol, nitric acid, or a combination thereof. In various embodiments, the solution can also include maleic anhydrate and/or tetrahydrophthalic anhydride.

The photocatalyst can comprise, for example, a metal oxide. The metal oxide can comprise $TiO_2$, $TiO_{2n}$, wherein n is an integer (e.g., from 1 to 10), $Bi_2O_3$, $BiPO_4$, $Bi_2XO_6$, wherein X is a dopant, $In_2O_3$, $Ga_2O_3$, $Sb_2O_3$, ZnO, or a combination thereof. The dopant X can comprise Au, Ag, Al, C, Pt, Si, W, or any combination thereof.

In general, the photocatalyst mixture can include from about 5 wt. % to about 50 wt. %, and more particularly, from about 10 wt. % to about 40 wt. %, of the alkoxide precursor. Thus, the photocatalyst mixture can include from about 5 wt. % to about 20 wt. %, and more particularly, from about 10 wt. % to about 20 wt. % of total silica content.

In some embodiments, a stabilizing agent is also added to the photocatalyst mixture during the introducing step. The stabilizing agent can comprise, for example, dilute nitric acid, acetic acid, hydrochloric acid, potassium hydroxide, sodium hydroxide, calcium hydroxide, sodium thiosulfate, or a mixture thereof. The stabilizing agent can also be introduced with a surfactant, for example, dish soap, butadiene, styrene, benzene, or a combination thereof, or any other suitable surfactant known in the art.

As noted above, introduction of the photocatalyst to the alkoxide precursor, with the addition of heat and/or agitation, initiates the hydrolysis and condensation reaction that produces the polymer gel. Water can be added throughout the process to the gel in order to ensure complete hydrolyzed polymers. This results in the partial hydrolysis of the alkoxide precursor to form reactive monomers, condensation of the monomers to form colloid-like oligomers, and additional hydrolysis to promote polymerization and cross-linking thereby leading to a three-dimensional matrix (gel formation).

The photocatalyst mixture can be rapidly gelled or slowly gelled in order to produce a varied or aligned pore structure in the resulting polymer gel.

After gelation occurs, polymerization is completed, and a foaming agent can then be introduced in order to displace the remaining solvent. In some embodiments, the foaming agent can comprise a hydroxyl source. Non-limiting hydroxyl sources include, for example, sodium hydroxide, potassium hydroxide, ammonium hydroxide, or a combination thereof.

Excess solution can be removed from the polymer gel through firing, desiccation, drying, or exposure to ambient environmental conditions. Thus, the process preferably comprises the step of firing the polymer gel at a low temperature (e.g., from about 200° C. to about 600° C., from about 200° C. to about 550° C., or from about 200° C. to about 500° C.) in order to obtain the porous granular media.

The rate at which the excess solution is removed from the gel or the manner in which the removal occurs is important for producing interconnected pores. Slower removal processes produce more interconnected pores though the required time can be lengthy. Faster removal processes produce less interconnected pore spaces and longer diffusion times but faster production times.

Further, silica content plays a role in the stability of the SGM post-firing, as well as the ability to fixate the catalyst within the media without embedding it. Including too little silica may result in large void formation during firing that creates a non-homogenous pore size and distribution throughout the structure. Thus, large void spaces formed during the rapid evaporation and activation of the foaming agent during firing are typically more readily observed in SGM having lower concentrations of silica. Foaming agent-induced pores decrease in abundance and relative size as silica content is increased. Because of this, increased silica content lends itself to an increase in the tortuosity and permeability of the pore space. While the cross-link formed pore-spaces appear smaller in average size, they also can be more interconnected, homogenous in distribution, and uniform in size. The increase in cross-linked structures is caused by the increase in nucleation sites the silica content brings, thus creating a more durable SGM. Increases in durability and strength of the SGM are demonstrated to improve as the degassing void space decreases and silica concentration during gelation increases.

Optionally, the process can also include, after the removing step, making surficial charge adjustments by an acidic or basic rinse through the addition of water, nitric acid, sulfuric acid, or a combination thereof. The process can also optionally include adding amendments, preferably nucleophiles, electrophiles, salts, or a combination thereof, through loading the media pore space with nitric acid, sulfuric acid, hydrochloric acid, potassium hydroxide, sodium hydroxide, calcium hydroxide, sodium thiosulfate, or a combination thereof. As will be understood by the skilled person, the type of amendment used determines the overall surface charge of the resulting media, and is particularly important when the media is used to degrade certain PFAS compounds. As specific examples, perfluorosulfonic acids and perfluoroalkyl acid precursors degrade under basic and acidic amendments and as such, the amendments preferably comprise nitric acid, sulfuric acid, hydrochloric acid, sodium thiosulfate, potassium hydroxide, sodium hydroxide, or a combination thereof. In contrast, perfluorocarboxylic acids degrade under acidic amendments and as such, the amendments preferably comprise sulfuric acid, nitric acid, hydrochloric acid, or a combination thereof.

The pore space dictates the ability of an acid or base added after formation of the SGM (e.g., in the surficial charge adjustment or amendment step) to leach and the rate at which it diffuses from the SGM.

Figure 3:
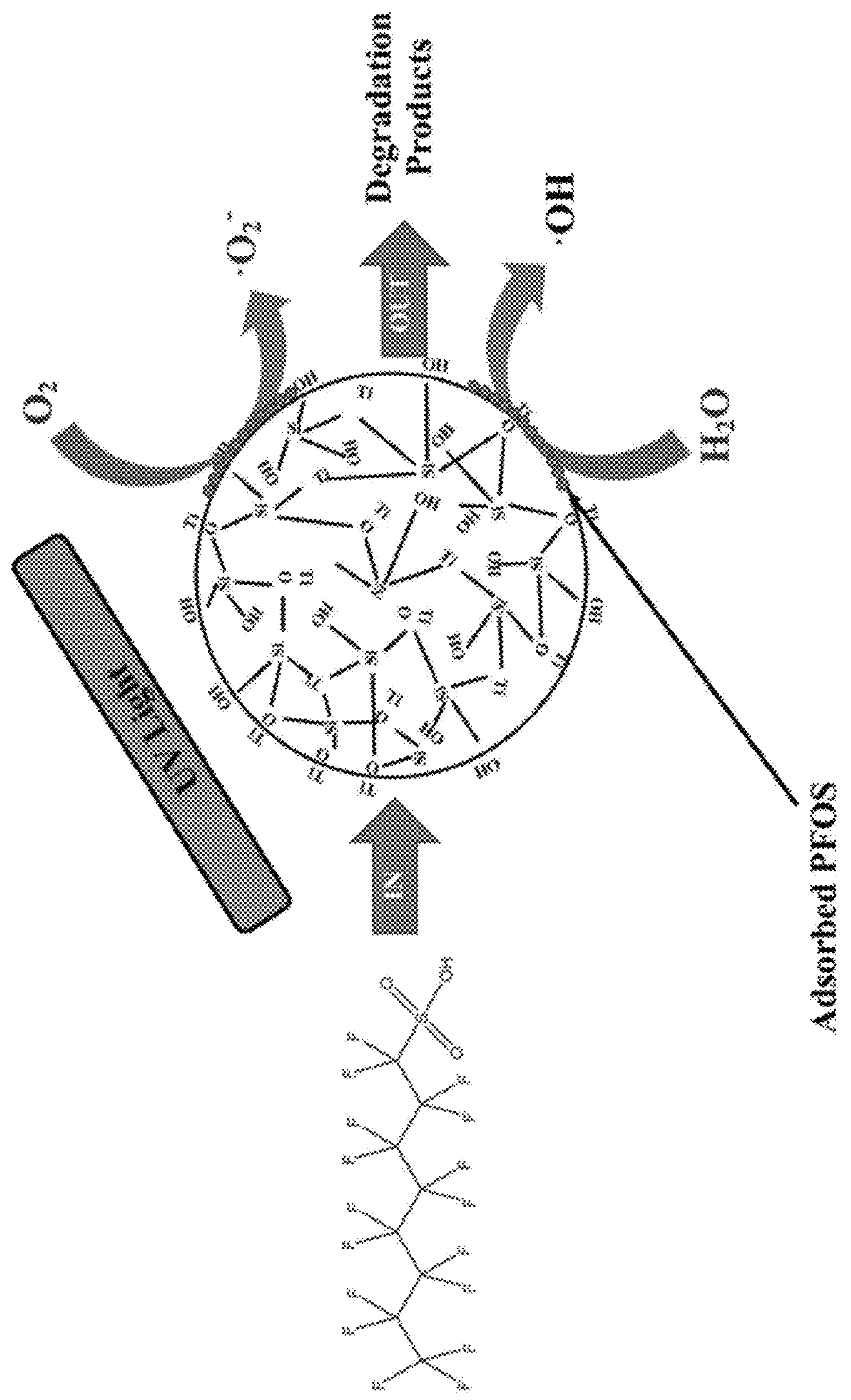
FIG. 3 shows the reaction mechanism of the coupled photocatalytic and nucleophile attack of a silica-based granular media (SGM) presented with UV light.
Figure 4:
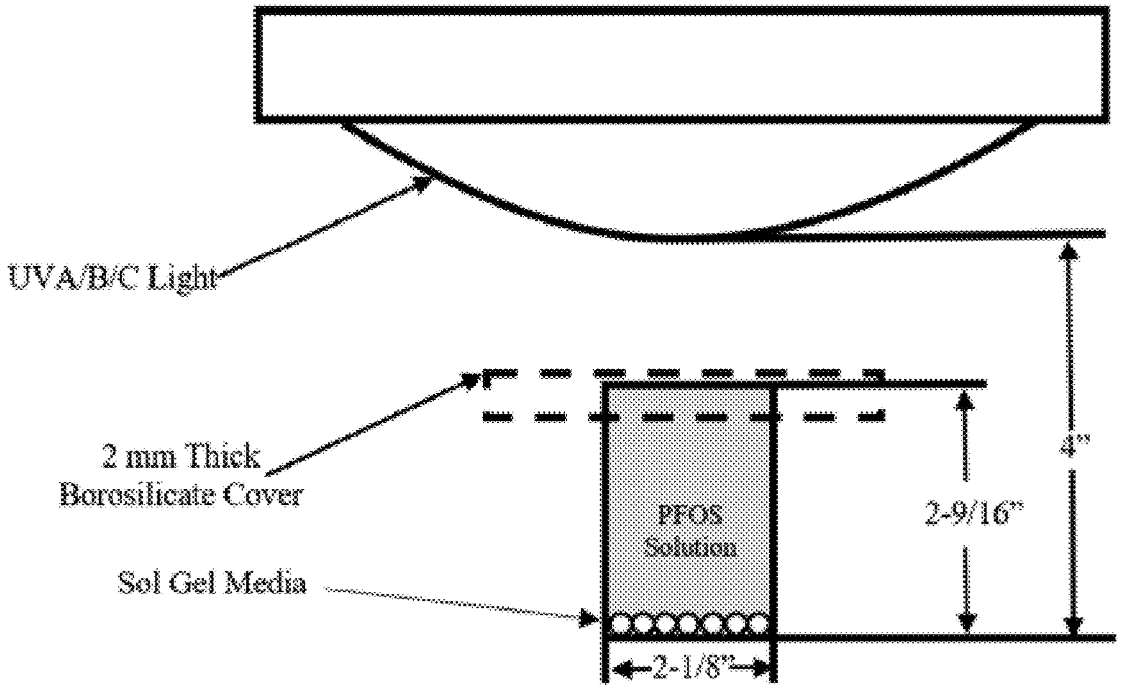
FIG. 4 is a depiction of the batch reactor schematic used in the Examples.

Acid stabilization methods can also be employed after the removing step to extend the life cycle of the media and give the outside surface of the SGM a positive charge, which improves reactivity. This process also dissolves free sodium hydroxide radicals on the surface of the SGM, thereby opening a direct path for UV interaction. Importantly, excess hydroxyls from the SGM synthesis will still remain in the pore structure (see FIG. 3). If the stabilization step does not occur, it is possible that the Si—O—Si bonds will begin to cleave from the elevated pH caused by NaOH addition. While the SGM can withstand several cycles without stabilization, serviceability and sustainability are inherently increased by removing properties of basicity of pH 12. To obtain a stabilized structure, the media can be soaked in an acidic solution for a period of time (for example, from about 12 hours to about 32 hours). Once soaked, the SGM is rinsed with water.

Method of Degrading Organic Compounds

The present disclosure also relates to a method of degrading one or more organic compounds. The method generally comprises introducing the organic compound(s) to the silica-based granular media described herein and irradiating the combination with electromagnetic radiation. The organic compound can comprise, for example, a perfluoroalkyl compound, a polyfluoroalkyls compound, a pharmaceutical compound (such as rifampin, acetaminophen, or a combination thereof), a textile dye (such as methylene blue, rhodamine red, azure A, methyl orange, or a combination thereof), or any combinations thereof.

As aforementioned, it is important that the granular media have the correct surface charge by, for example, addition of amendments, particularly in situations where PFAS compounds are degraded. In some circumstances, when the organic compound comprises a PFAS compound, the process of making the granular media may require cycling between acidic and basic amendments in order to fully degrade the PFAS compound.

The organic compound(s) can be provided and introduced to the granular media in any acceptable form. Preferably, the organic compound(s) are in a solution or in the form of an aerosol. For example, the SGM can be used in HVAC or air recycle systems in which aerosols or charged particulates can be attracted to the SGM under electrostatic means, sorbed to the surface, and then treated. The SGM can also be utilized as a thin film or coating when extruded.

The SGM is reusable for multiple cycles of treating, breaks down very slowly, and produces few by-products during degradation. Although some by-products may be produced, they are generally non-hazardous. In preferred embodiments, at least about 80%, at least about 85%, at least about 90%, at least about 95%, or at least about 99% of the organic compound(s) is fully degraded (e.g., mineralized).

Typically, the electromagnetic radiation that the one or more organic compounds is exposed to is ultraviolet radiation with a wavelength of from about 100 nm to about 400 nm.

Reactor

The present disclosure is also directed to a reactor for degrading the one or more organic compounds. That is, the reactor can be used in the above-described methods to introduce a solution, aerosol, or other appropriate composition form containing at least one of the organic compounds described above to the silica-based granular media described herein to degrade and remove the one or more organic compounds from the composition.

Figure 1B:
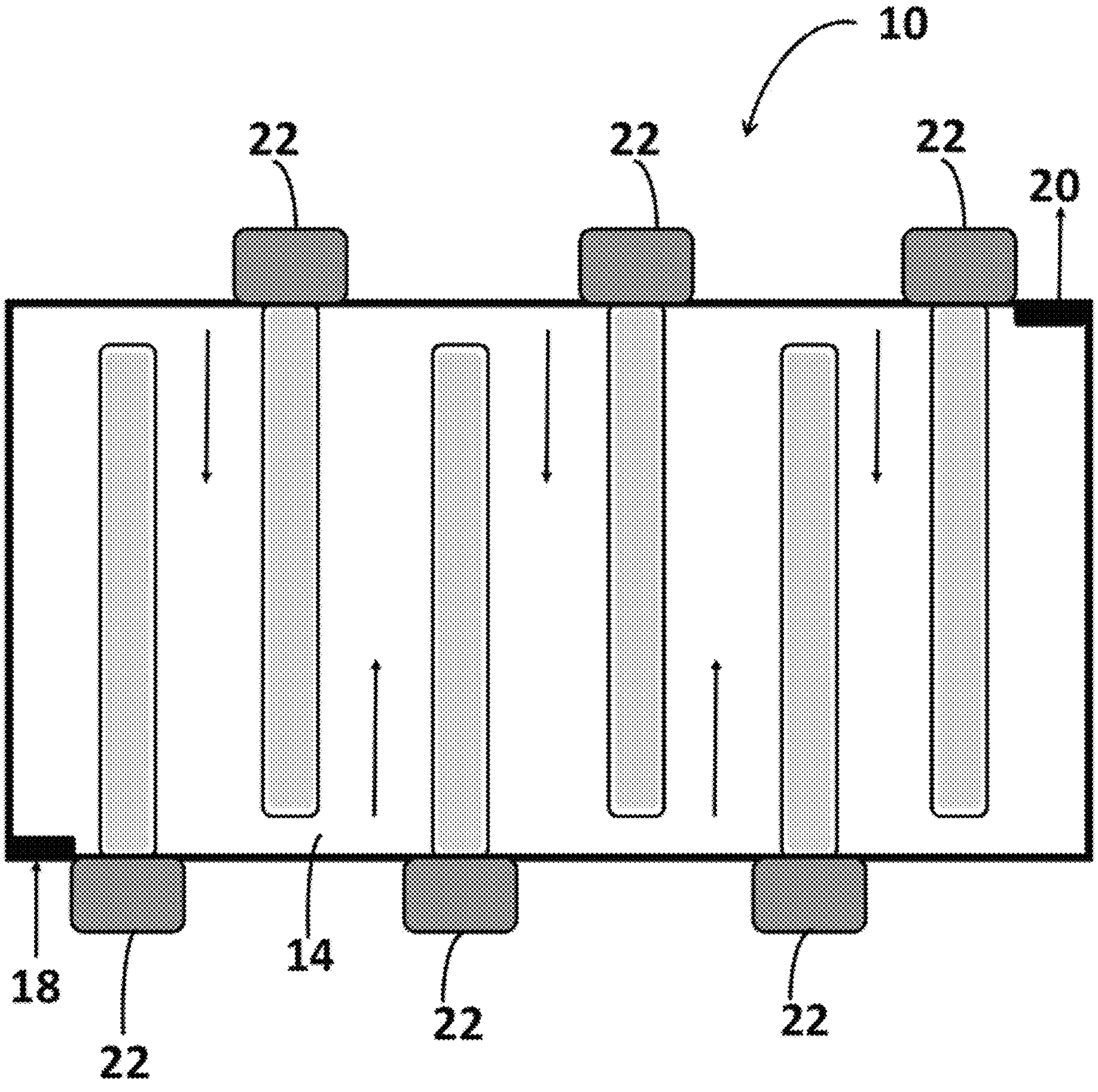
FIG. 1B shows an internal top plan view of the continuous reactor of FIG. 1A.
Figure 2A:
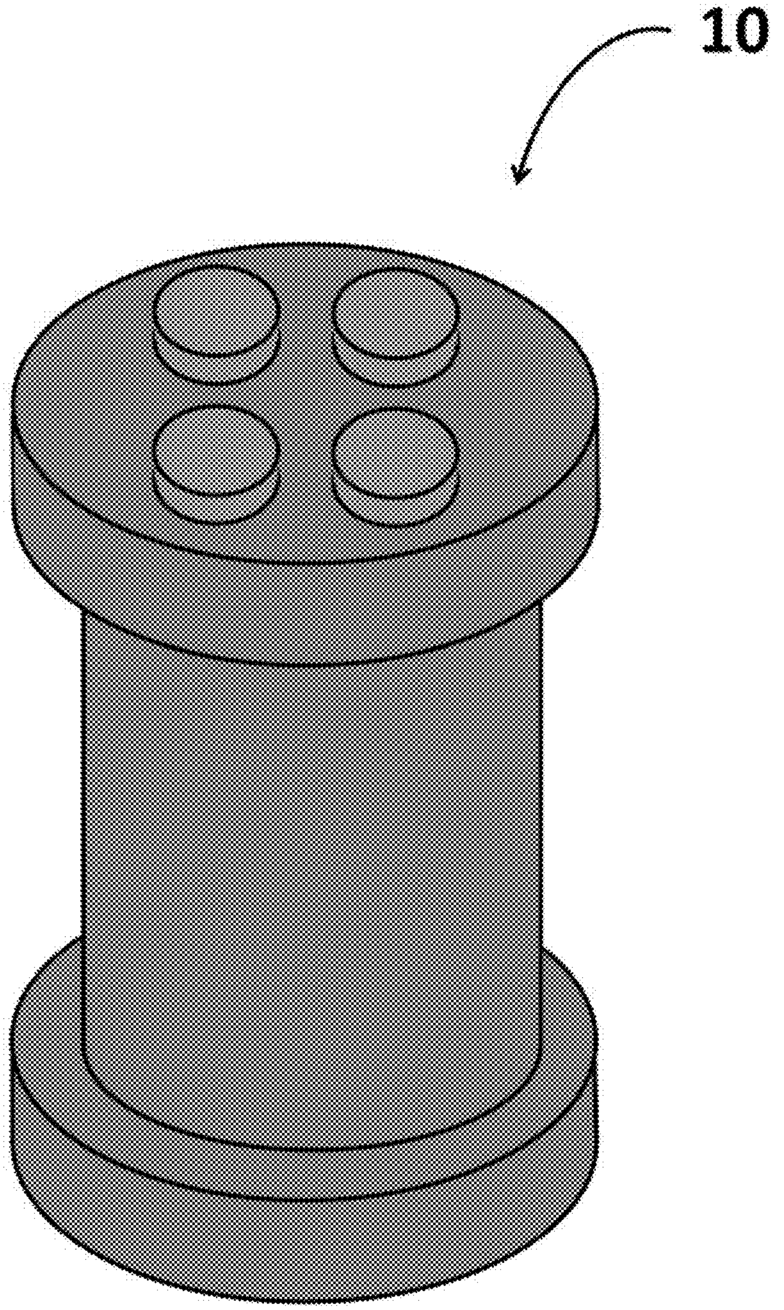
FIG. 2A shows a perspective view of a recirculation reactor using the SGM.
Figure 2B:
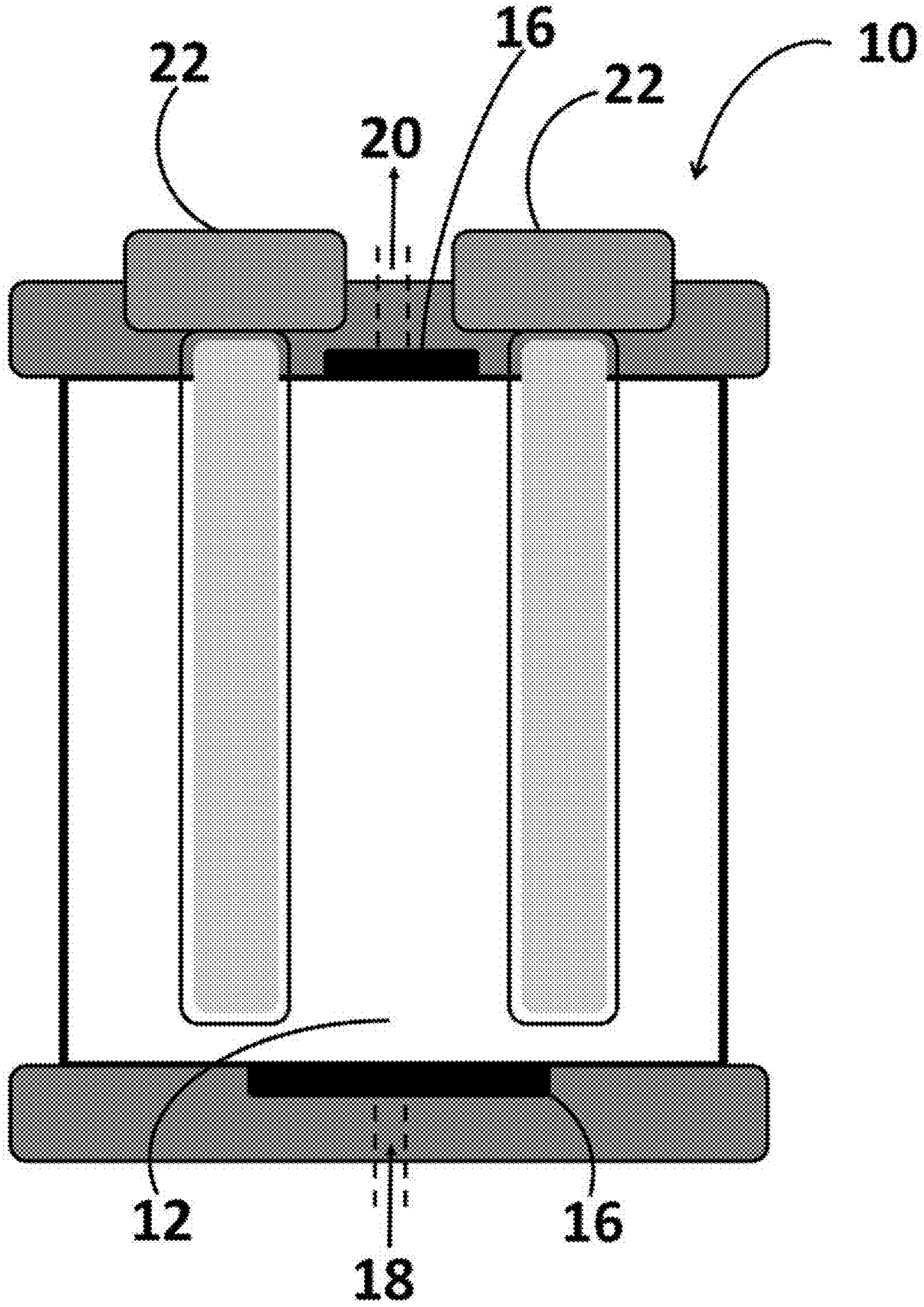
FIG. 2B shows an internal side plan view of the recirculation reactor of FIG. 2A.

Referring in particular to FIGS. 1 and 2, reactor 10 generally comprises an inlet 18, outlet 20 and one or more UV light sources 22. The reactor 10 can be a batch reactor or a column reactor, and can include continuous flow reactor (FIGS. 1A and 1B) or a recirculation reactor (FIGS. 2A and 2B). In various embodiments, the continuous flow reactor may have a serpentine arrangement.

Both types of reactor allow for passage of a composition containing the organic compound(s) through a treatment area packed with the silica-based granular media described herein, such as column 12 depicted in FIG. 2B or other treatment area 14 depicted in FIG. 1B, wherein the organic compound(s) is retained and degraded. Additional granular media as described herein can be packed into a media area 16, typically located near an inlet 18 or outlet as depicted in FIG. 2B.

The continuous flow reactor can contain one column 12 or a series of columns (e.g., two, three, or four columns) adjacent to one or more UV light sources. Alternatively, the UV light source may be embedded in treatment 14 area to create a serpentine path in the treatment area through which the incoming stream can flow. The UV light source may be embedded in or adjacent to the recirculation reactor.

In this way, the one or more organic compounds pass over the SGM and are exposed to a UV light source 22 in the reactor, typically having a wavelength of from about 100 nm to 400 nm, to activate the SGM and degrade the organic compound(s). The UV light can contain ozone (185/254 nm wavelength) or can be ozone free (254 nm wavelength). More than one UV light source can be included in the reactor and is typically dependent on the size (e.g. length or diameter) of the reactor. That is, a longer reactor may require an increased number of UV light sources.

In various embodiments, the UV light source can comprise a standard low-pressure mercury lamp, an amalgam lamp, a combination thereof, or any other acceptable light source known in the art. Typically, the UV emission from the light source is from about 1 watt to about 50 watts. The UV light source can be encased in a quartz sleeve.

As mentioned, the reactors contain an inlet 18 to allow incoming passage of a waste stream (containing the one or more organic compounds) and an outlet 20 to allow removal of the outgoing stream (with at least a portion of the one or more organic compounds removed). A pump 24 can also be used with the inlet to keep a steady flow of waste stream.

Having described the invention in detail, it will be apparent that modifications and variations are possible without departing from the scope of the invention defined in the appended claims.

EXAMPLES

The following non-limiting examples are provided to further illustrate the present invention.

Example 1a: Batch Reactor Experiment

The following Example evaluates the ability to use SGM as a destructive technology for PFAS, and specifically PFOS. PFOS was selected as a surrogate compound for a concentrated aqueous waste stream due to the relative difficulty of degradation when compared to PFOA. Testing was carried out in polypropylene batch reactors with a borosilicate cover to minimize evaporation (see FIG. 3). A single layer of SGM was adhered to the bottom of the batch reactor and cured before 35 mL of solution, containing the analyte of interest, was pipetted into the reactor with minimal headspace. Experiment methodology was modified from ISO 10678, which established procedures and parameters for testing the photocatalytic nature of ceramic surfaces degrading dyes when exposed to UV lights. Modifications from the standard including changing the analyte of interest and the reduction of the surface area exposed to irradiation.

The single layer of SGM consisted of approximately 0.10 g of photocatalyst with reactive species only on or near the surface within a direct path of the UV light. UVA/B/C lights operating over a wide range of wavelength spectra from 550 nm to 250 nm were precisely placed 10.16 cm (4 in.) above the targeted SGM. Aqueous stock solution of 500 mg/L PFOS were prepared for serial dilutions utilized in batch reactors. Dilutions of the stock solution were prepared with DI water, 1 M sodium hydroxide, or 1 M sodium thiosulfate. The final analyte concentration of 50 mg/L PFOS was fixed throughout all experimental testing. While the SGM is capable of diffusing out preloaded salts or nucleophiles during treatment, dilutions with those solutions occurred during batch reactor experiments. This can be attributed to the small mass or dose of SGM used for testing compared to what would be present in a packed column. Therefore, nucleophile solution concentrations were calculated to equate to the diffusive abilities of the SGM during column reactors for proportionate pore volumes.

Reactor contact time ranged from 0 to 360 min, with aliquot sampling of 600 μL (100 μL for LC/MS and 500 μL for IC) occurring at various time intervals. Samples were contained in polypropylene microcentrifuge tubes and stored in a dark room at 4° C. prior to analysis. All analysis occurred within a maximum 24-h window after extraction from batch reactor experiments were completed in order to mitigate any external influence of contamination of the samples.

Experiment 1b: Batch Reactor Sample Preparation and Analysis

Sample preparation and LC/MS methodologies were modified from ASTM D7979-20 and EPA 537. Each 100-μL sample was centrifuged for 20 min at 14,000 rpm while maintained at a temperature of 4° C. A 5-μL aliquot of the supernatant was extracted and diluted in 995 μL of solvent S (1:1 MeOH/$H_2O$+0.1% glacial acetic acid), thoroughly mixed, and again centrifuged. A 40-μL aliquot of the supernatant was then further diluted with 160 μL of solvent S. MPFOS (sodium perfluoro-1-[1,2,3,4-$^{13}C_4$]-octanesulfonate) was added to solvent S prior to the second dilution as an internal standard. The final resulting concentration was 50 ng/mL MPFOS in each sample. Each sample mixture was cortex mixed for 30 s and then injected into the UHPLC.

LC/MS analysis was performed on a SHIMADZU Nexera XR (40-Series) UHPLC system coupled with a SHIMADZU 9030 Q-ToF Mass Spectrometer+DUIS ionization source. A RESTEK Raptor ARC-18 (100 mm length, 2.1 mm internal diameter, 1.8 μm particle size, 90 Å pore size) analytical column was used solely for these experiments and stored between batches in order to eliminate contamination. Analyte elution was performed using gradient elution with 25-mM solution of ammonium acetate in water containing 3% (v/v) acetonitrile (Solvent A) and 100% acetonitrile (Solvent B) at a flow rate of 0.35 mL/min. The temperature of the autosampler and column oven were set at 4° C. and 40° C., respectively. LC/MS analyses were performed using 1-μL sample injections using negative ionization mode-based detection.

Throughout experimental analysis, samples were analyzed for PFOS reduction and screen for possible by-products. Untargeted analysis was performed on each sample using liquid chromatography quadruple time-of-flight mass spectrometry (LC-QToF-MS). While all m/z values observed were reviewed as a possible by-product, perfluoroalkyl carboxylic acids (PFCAs) were specifically screened for by-products and were quantified using Wellington standards.

Free fluoride in solution, or aqueous fluoride, was measured using a DIONEX IC System (ICS-90) with an automated sampler (AS40) Chromeleon 6.80. The ICS-90 system contained a 4×250-mm AS23 analytical standard bore column (Part #064149), An AG23 guard standard column (064147), coupled with an AMMS 300 chemically driven suppressor (064558), and a D5 stabilizer conductivity cell. A 50-μL injection loop was used as a standard for all samples and standards. Individual samples of 0.5 mL were diluted to 5 mL with DI water in order to reduce the solution pH below 10 S/U. This preparation was done in part to allow the bicarbonate eluent to buffer the injected solution but also to reduce the peak-to-peak interference between fluoride and chloride, and to extend the baseline near the water dip. Eluent stock solution was prepared consisting of 450 mM of sodium carbonate and 80 mM of sodium bicarbonate. 30 mL of eluent stock solution was then diluted to 2,000 mL in a mixture of DI water with 3.5% methanol by volume to minimize organic buildup within the system. The increased eluent concentration from the traditional 100× dilution from stock was chosen to preserve baseline conductivity, create better peak separation in the chromatography, and optimize the eluent buffering capacity. Regenerant solution was diluted from 75 mL of 2.0 N sulfuric acid to 2,000 mL with DI water. A 5% relative standard deviation (RSD) was used for the triplicate analysis of analytes measured with the ICS-90 following the standard method. Fluoride calibration standards of 0.1, 1.0, 5.0, 10.0, and 25.0 mg/L were diluted from a 1,000 mg/L stock and ran prior to the analysis of each set of samples. Each sample run time was increased to 32.5 min to ensure peak separation with an average pressure of 1,900 psi. A blank/wash of DI water was run between each sample to ensure no contamination in the peak area from the previous sample occurred. Sample and standard preparation and analysis, along with quality control, were consistent with EPA method 300.0.

Example 1c: Batch Reactor Results

Figure 5:
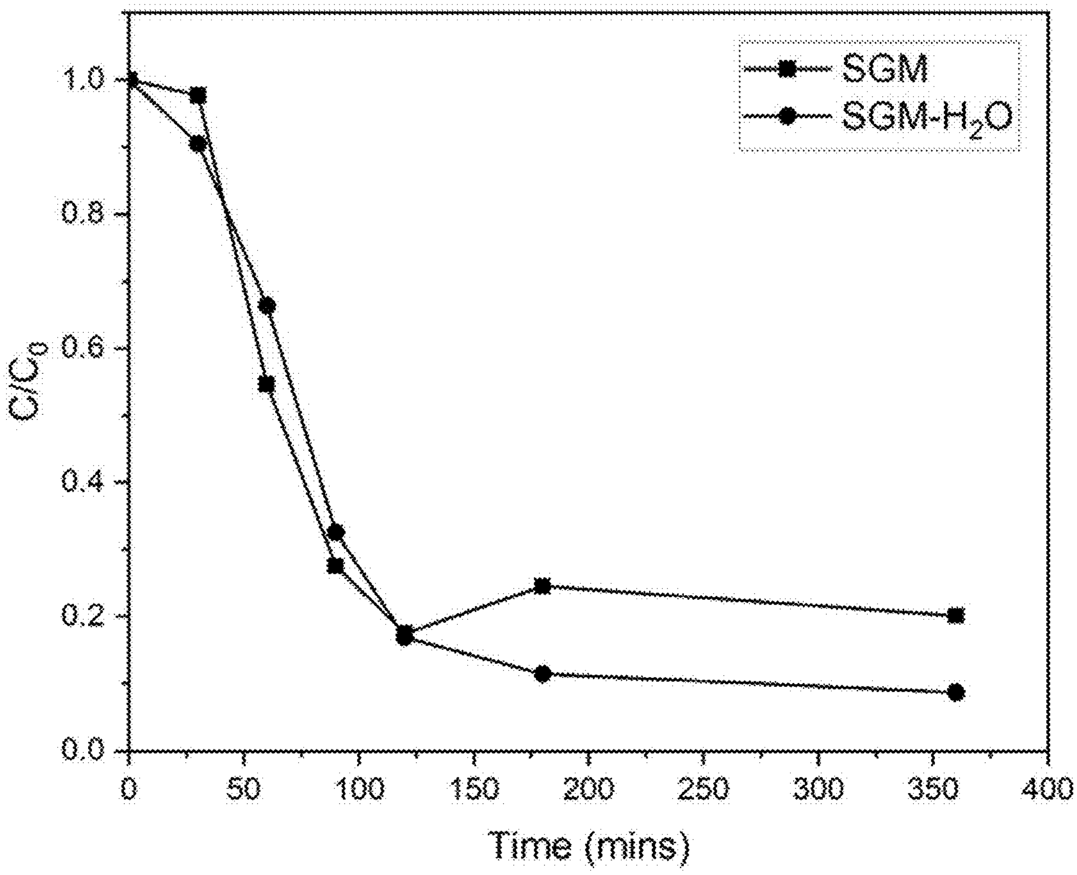
FIG. 5 is a graph of sorption/desorption of PFOS on dry versus saturated surface dry (SSD) condition SGM.

SGM was adhered to the bottom of the polypropylene reactors 24 h prior to testing. Initial batch reactor experimentation was performed on the SGM with water as an addition to determine the effect of filling the pore space with solution in comparison to a dry media. This experiment was performed to separate the adsorption to the SGM from the absorption. DI water was poured on the single layer of SGM 12 h before testing. The media was dried to saturated surface dry (SSD) condition just before testing was initiated to ensure all pores were filled but excess water was not on the surface. FIG. 5 shows that pre-saturating the pore space prevented additional absorption of PFOS into the pore space and delayed desorption at later time intervals (120 to 180 min) was mitigated. In addition, the SGM saturated in water degraded PFOS at a higher rate than the dry media, because the surface of the photocatalyst was able to readily adsorb rather than needing to wet the surface first. After 30 min of experimentation, the PFOS degradation rate of the pre-wetted SGM was just under 10% greater than the dry media.

Figure 6:
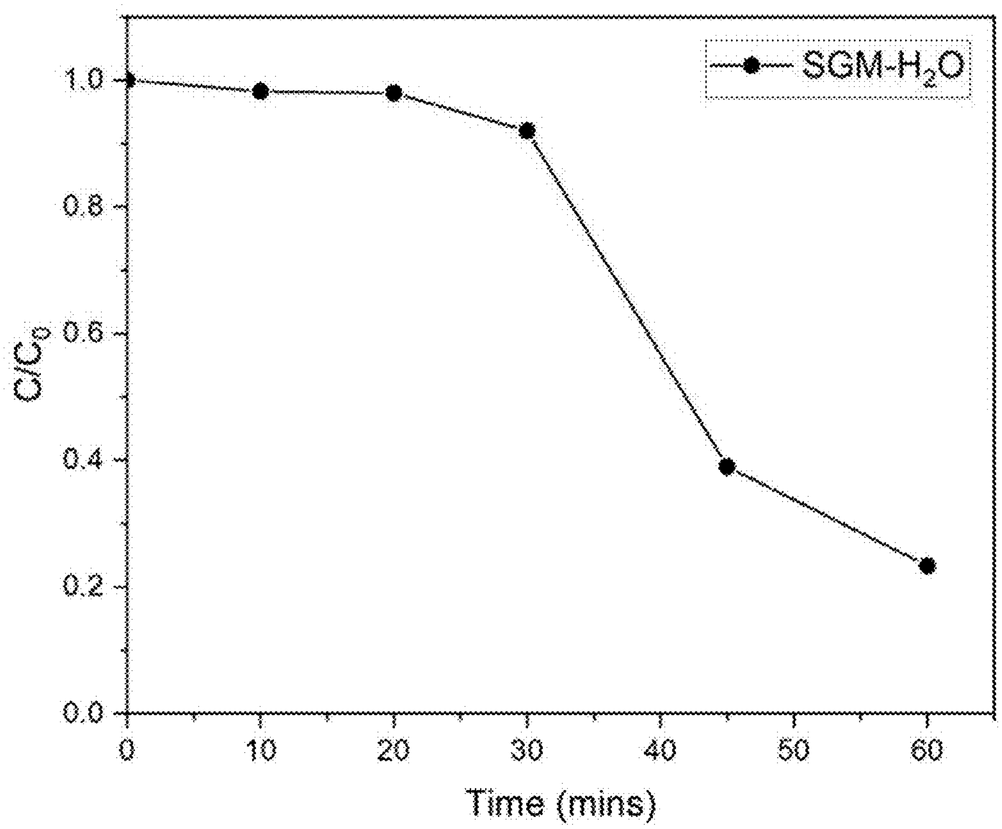
FIG. 6 is a graph showing rapid degradation of PFOS over time.
Figure 7:
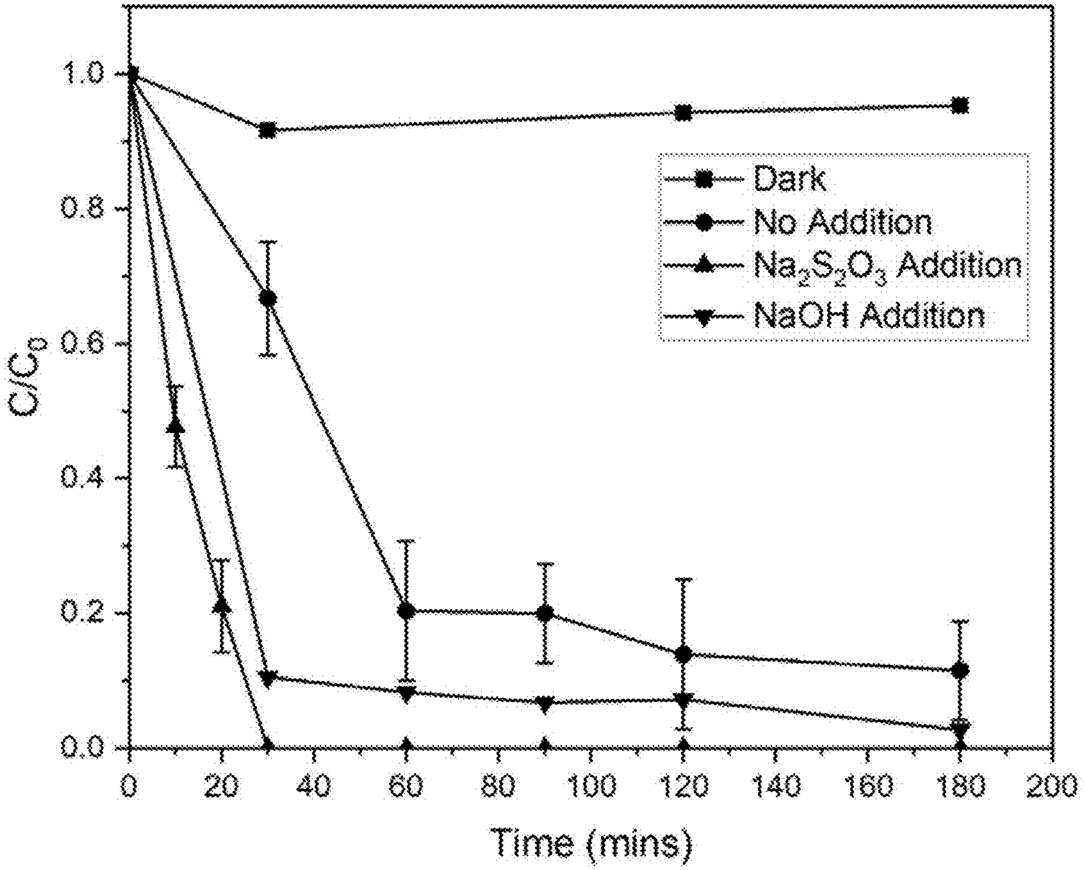
FIG. 7 is a graph showing the removal of PFOS over time with various nucleophile additions.

Considering that the absorption capacity of the SGM only allowed for a total volume of 1 mL to be present in the pore space, it can be determined that the increased rate was not due to dilution. FIG. 6 presents data showing that rapid PFOS degradation did not occur until after minute 30. This is likely due to the time it takes for the UV lamp to ramp up to full output. To minimize any delayed reactions, the lights were turned on 30 min prior to initiating experimental testing. SGM was not pre-wetted prior to the experiment in FIG. 5, which may also be responsible for the 30-min lag in destruction of PFOS. Additionally, this supports the hypothesis that adsorption to the catalyst is a function of PFOS reduction. In order to delineate the role that wetting the surface and internal pore space played during experimentation, this variable was isolated. Additional experiments present later were all soaked in DI water for 12 h and dried to SSD condition prior to experimentation.

Analysis performed using LC-QToF-MS and ICS-90 was performed in triplicated and is presented in FIG. 5 by the following treatment type: no addition, $Na_2SO_3$ addition, NaOH addition, and dark. Duplicate trials performed over time with the average value are reported in FIG. 6. Each treatment type demonstrates an initial rapid decrease of PFOS in solution except the dark sample. The lack of PFOS degradation in the dark sample is critically important to note because it indicates that once PFOS coats all of the available surface sites of the SGM (~10%), further surficial adsorption cannot occur. This means that any degradation in excess of the dark sample occurs during irradiation. The SGM without any preloaded amendment denoted as no addition represents the minimal PFOS removal possible for the variables presented, because it only uses a photocatalytic attack reaction mechanism.

The preferred amendments for the SGM combined degradation pathway and complete mineralization of PFOS are nucleophiles; however, the instability of the Si—O bonds at elevated and sustained pH above 12.0 S/U is problematic. Sodium hydroxide was chosen to challenge the durability of the SGM in sustained elevated pH conditions. Sodium thiosulfate, a weaker nucleophile, was selected because it raises pH less than 10 S/U, allowing for a sustained dual attack. While the NaOH addition did yield higher removal of PFOS than the SGM without any addition, the outer shell of the SGM began to dissolve in the high pH. As this continued, the solution became very turbid and hindered the photocatalytic attack, resulting in lower capacitive removal than the $Na_2S_2O_3$ addition. $Na_2S_2O_3$ addition consistently performed at high efficiency, with >99% removal in 30 min.

One line of evidence that defluorination and therefore destruction of PFOS is occurring is the measurement of anionic fluoride using IC. $Na_2S_2O_3$ addition performed the best of all treatment types, and samples of this treatment were then analyzed for free fluoride in solution over time, along with no addition treatment as a comparison (FIG. 6). The fluoride concentrations in solution from the NaOH addition treatment was only analyzed at the 60-min mark, as the SGM became unstable after this time interval. In general, the shape of the curve of the aqueous fluoride was consistent between the no addition and the $Na_2S_2O_3$ addition treatments presented in FIG. 8. Each treatment type depicted a bell curve shape, forming a curved increase raising to a peak and then decreasing rapidly. However, while the shapes of the curves are similar, $Na_2S_2O_3$ achieved a much higher peak concentration at an earlier time. Theoretically, this behavior can be due to the affinity for fluoride to bon to silica present in the SGM. Nucleophilic solutions within the media pore space diffuse from within the SGM to free solution during treatment, resulting in electron compound substitution for the PFOS functional group. Strong carbon-fluoride bonds of 544 kJ/mol compose the backbone of the PFAS structure, while the spontaneous sorptive silica-fluorine bond strength is greater at 582 kJ/mol. The greater concentration of $F^-$ (ppm) in the $Na_2S_2O_3$ addition is contributed to the rapid degradation and defluorination of PFOS in 30 min, therefore releasing free fluoride into solution before entering the SGM. Compared to the $Na_2S_2O_3$ addition trial, the no addition treatment presents as a slower attach, such that the exchange of fluoride and nucleophile into and out of the SGM occurs simultaneously with PFOS degradation. Free fluoride in solution in the $Na_2S_2O_3$ addition treatment trials approached zero after 60 min, with no fluoride present after 90 min. However, free fluoride is still present after 120 min in the no addition treatment. Some of the fluoride derived from the defluorination of PFOS bonds to silica within the SGM in both treatments. After initial evaluation of aqueous fluoride, it was determined that the peak concentration occurred approximately 60 min into the experiment.

Figure 9:
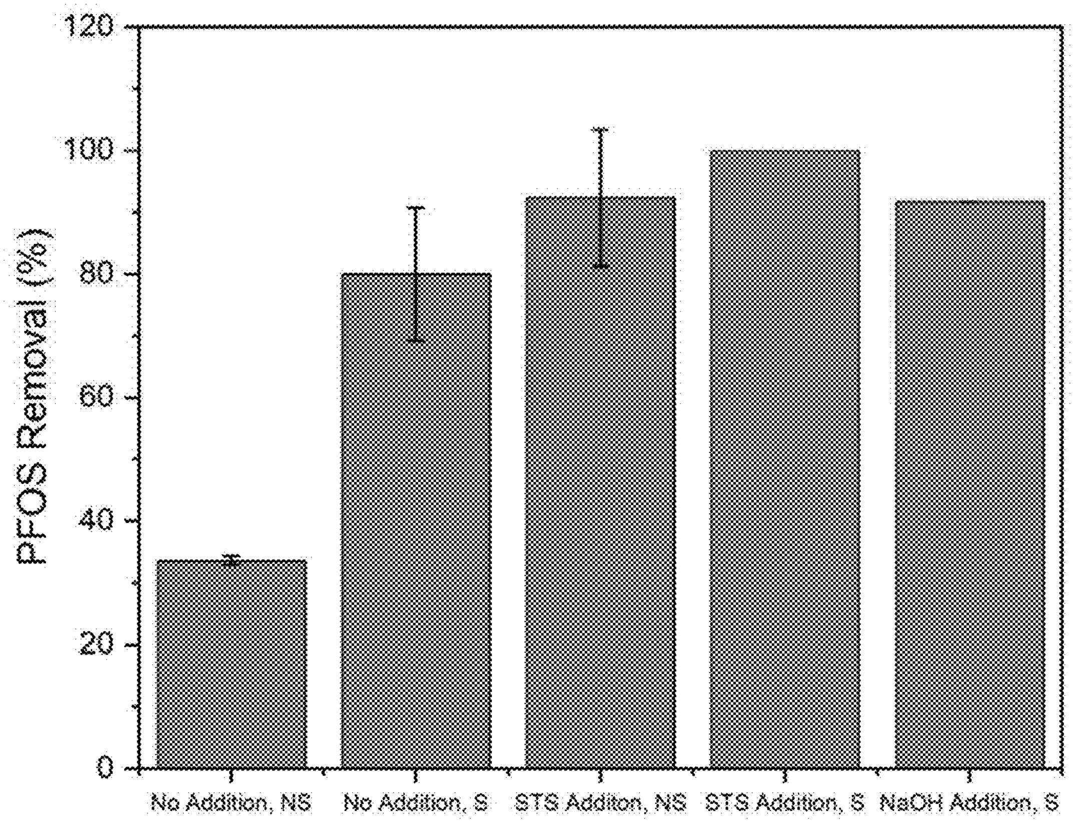
FIG. 9 is a bar graph showing PFOS removal at 60 min with various nucleophile additions.
Figure 10:
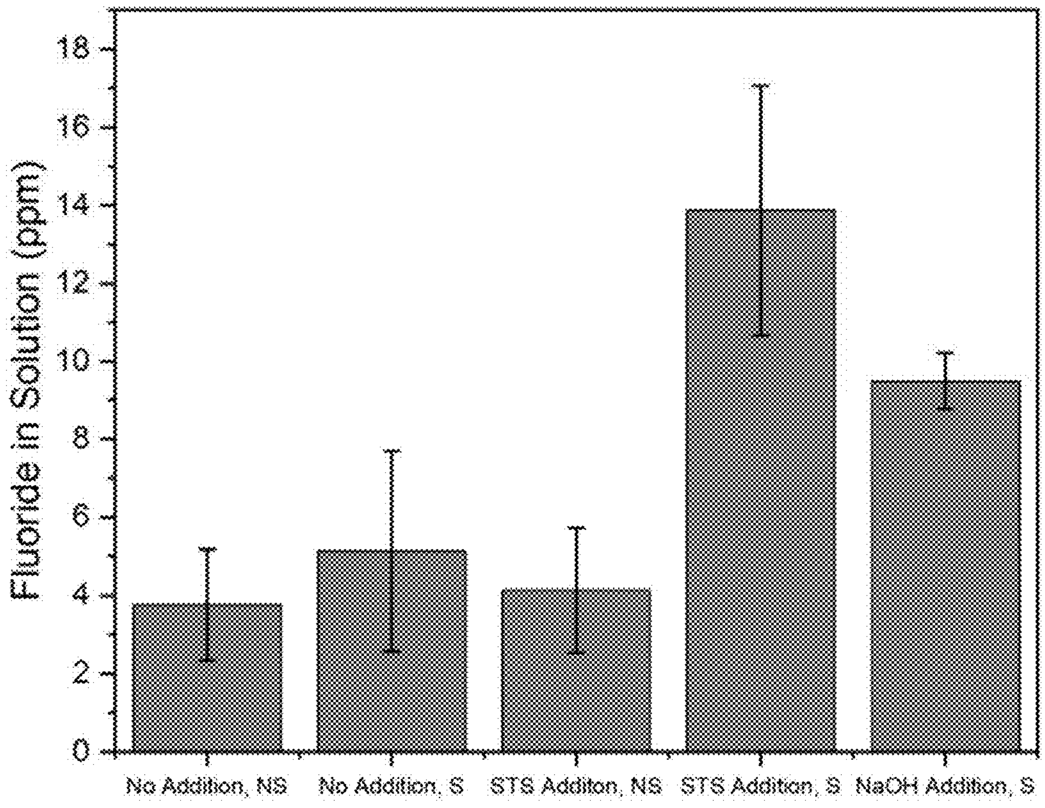
FIG. 10 is a bar graph showing free fluoride in solution at 60 min with various nucleophile additions.

In order to render a positive charge to the surface cell of the SGM, media was stabilized in acidic conditions. Further experimental testing was performed in triplicate to validate that the acid stabilization of SGM did not hinder the photocatalytic degradation of PFOS. Experimentation included analysis of both PFOS removal (FIG. 9) and aqueous fluoride (FIG. 10). Data presented in FIG. 9 presents the PFOS removal of stabilized (S) and not stabilized (NS) media with the same nucleophile treatment amendments of $Na_2S_2O_3$ (STS) and NaOH. Acid stabilization allowed for greater PFOS removal and defluorination due to the mitigated turbidity of the solution, thus allowing the UV light to more consistently interact with the photocatalyst. PFOS removal was greatest with the $Na_2S_2O_3$ addition amended in an acid stabilization SGM ($Na_2S_2O_3$, S). However, the non-stabilized version still removed over 90% of the initial 50 mg/L concentration. Both the stabilized and non-stabilized no addition treatments produced similar results for both PFOS removal and fluoride production. When compared to the non-stabilized STS addition SGM, the stabilized versions produced more free fluoride at 60 min. Only a stabilized version of the NaOH addition treatment was tested due to the instability of SGM in high pH over time. Maximum free fluoride at 60 min reached 13.87 ppm in the stabilized $Na_2S_2O_3$ addition treatment, which represents 51% defluorination of PFOS. While fluoride production is one line of evidence that destruction of PFOS is occurring, the presence of by-products adds additional credence to this destructive pathway.

The presence and production of PFOS by-products were analyzed using LC-QToF-MS. During LC/MS analysis, the m/z value associated with $C_7F_{13}O_2^-$ was initially produced in the no addition treatment at 15 min of experimental treatment. While analysis was performed to identify the production of other by-products, only $C_2F_3O_2^-$ was consistently present at all time intervals. The degradation pathway theorized, from the by-products detected, is a combined free hydroxyl and free radical attack that inundates the C—S bond, which is replaced with an alcohol. This results in a PFCA upon stabilization. The proposed degradation pathway is supported by the presence of perfluoroheptanoic acid. Perfluoroheptanoic acid was not identified; however, this could be due to the rapid degradation of the PFOS prior to the first time increment. The free radicals generated by the $UV/TiO_2/H_2O$ interaction and the nucleophiles develop a dual attack on the $C_x$ carboxylate chain in a stepwise systematic release of HF until defluorination. The only by-product observed in the nucleophile addition treatments was $C_2F_3O_2^-$ and aqueous fluoride. This is attributed to the rapid degradation of PFOS and the affinity for by-products to enter the SGM once the functional head is removed. This phenomenon occurs as the free radicals begin to degrade the C—F chains, and fluoride begins to bond to the silica in the SGM. Free radical generation continues to interact with the degraded chains and break down the by-products as they are produced. As the defluorination of these C—F chains continues, fluoride is released into solution, which bonds to the silica present in the SGM. Assuming the C—F chains degrade at a constant rate, $F^-$ is released rapidly at the same time interval, which explains why a large peak of $F^-$ concentration can be seen at about 60 min.

While multiple by-products were observed throughout the experiment, only the aqueous fluoride in solution was quantified. The total organic fluoride in the solution was calculated to be 32.3 mg/L. Peak fluoride recovery is reflected in FIG. 9. FIG. 10 reflects free fluoride remaining in solution at the 60-min mark. Qualitative analysis was performed on the SGM to determine whether by-products could be present in the pore space.

Figure 8:
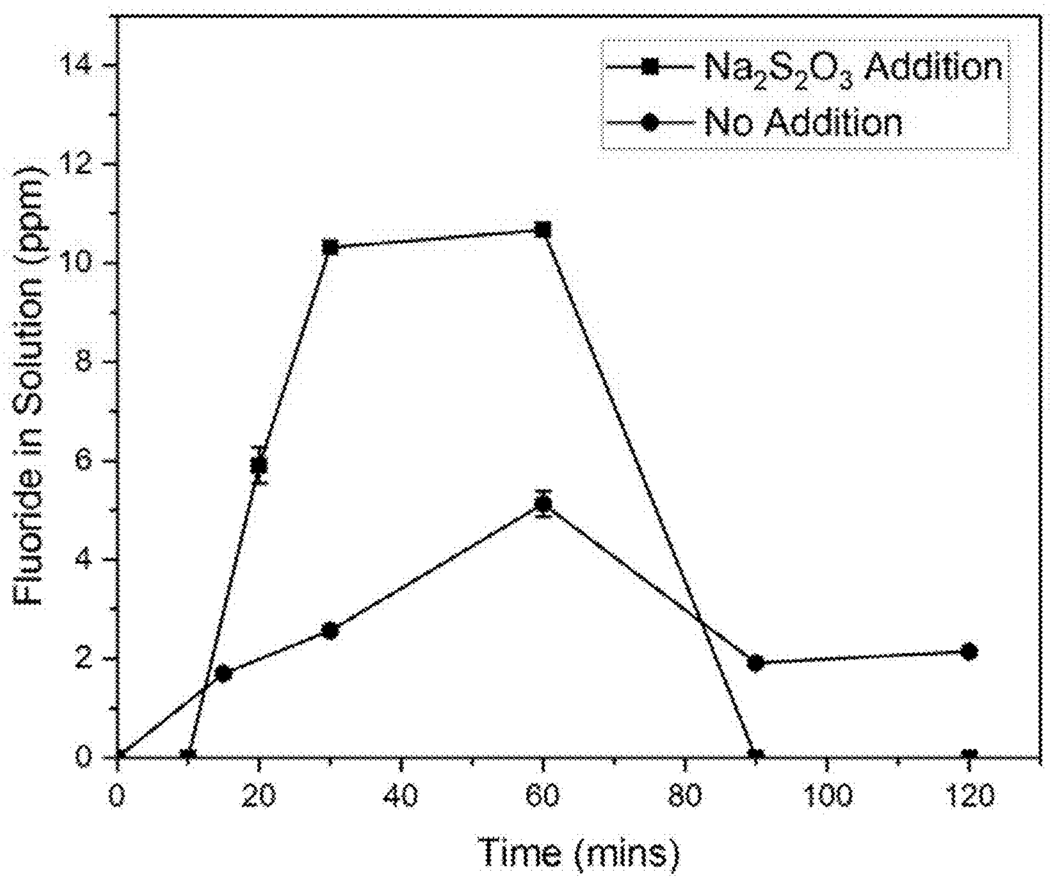
FIG. 8 is a graph showing free fluoride in solution over time.
Figure 11:
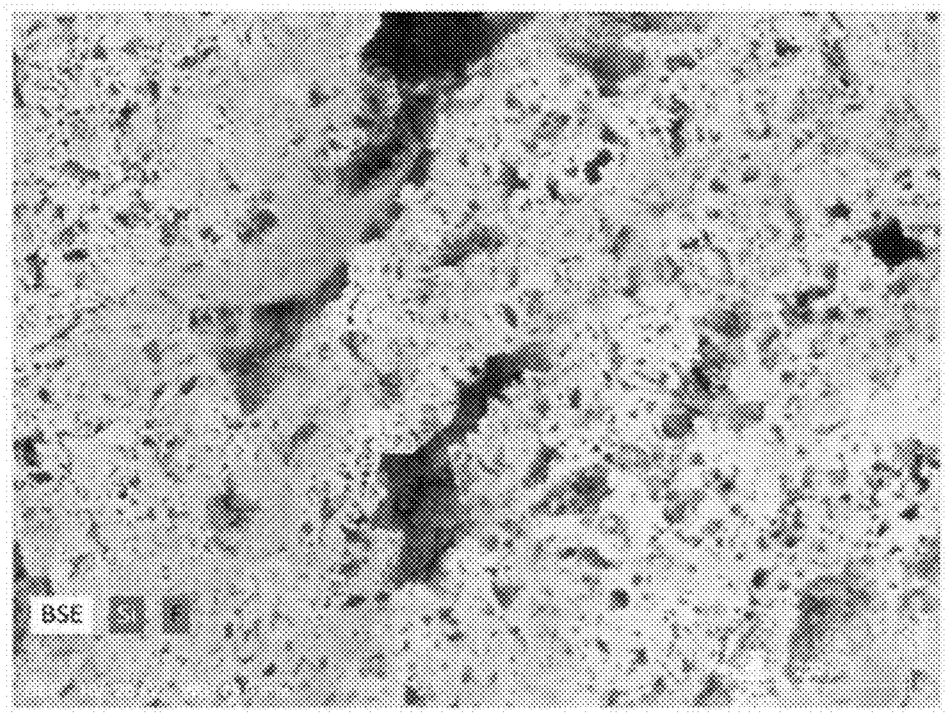
FIG. 11 is a combined overlay of an SEM backscatter image with EDS elemental mapping.
Figure 12A:
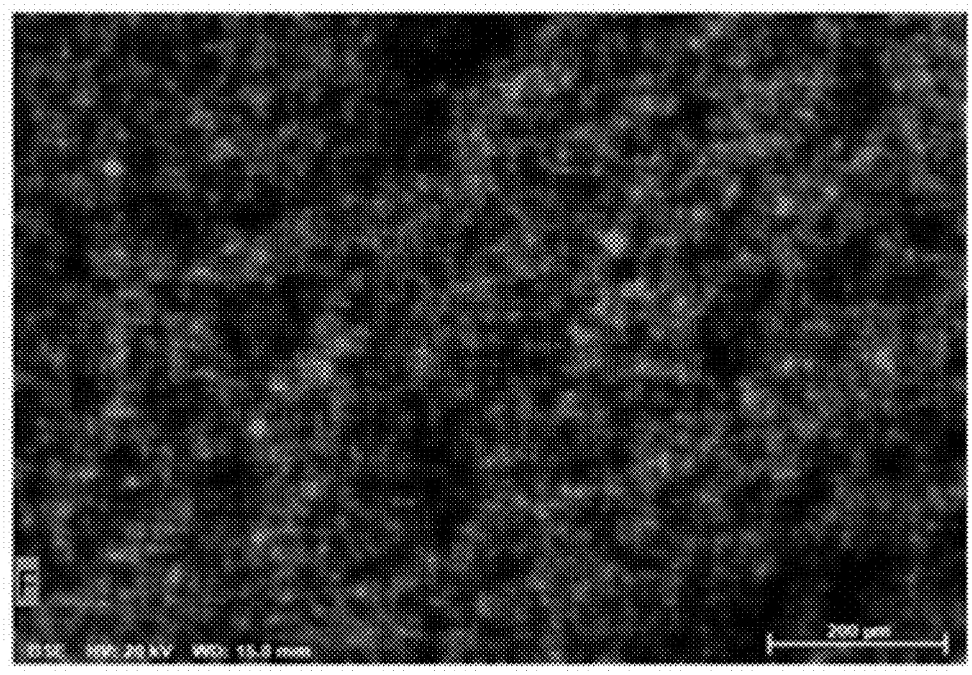
FIG. 12A is a separated elemental mapping image of FIG. 8 showing fluoride.
Figure 12B:
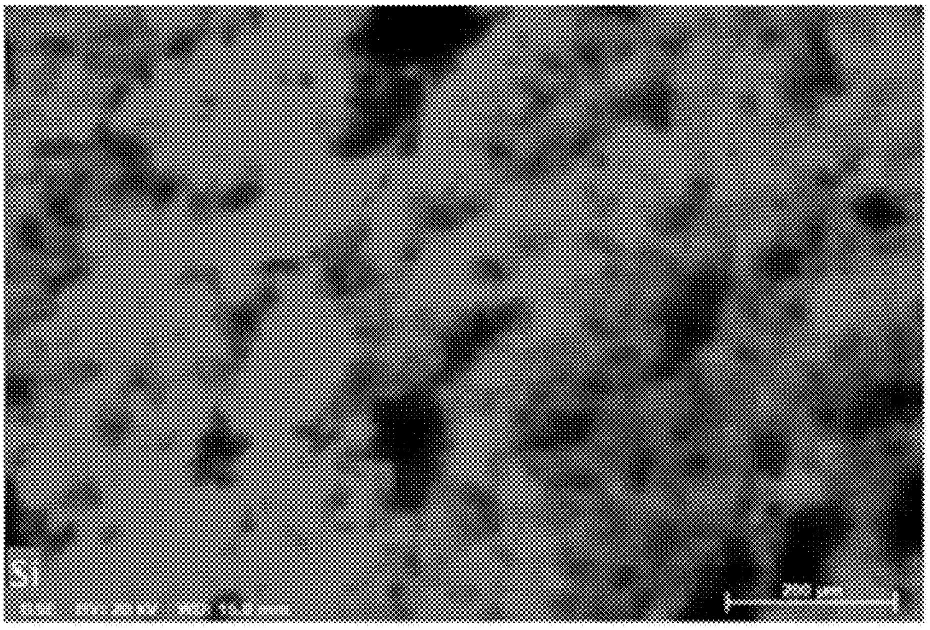
FIG. 12B is a separated elemental mapping image of FIG. 8 showing silica.

Scanning electron microscopy (SEM) and energy dispersive x-ray spectroscopy (EDS) analysis was performed and is presented in FIGS. 11 and 12. Prior to inspected by SEM, the SGM were rinsed with methanol to remove any residuals of PFOS not bonded to the SGM. SGM specimens were loaded onto carbon tape and carbon coated to ensure quantitative results during elemental mapping. SEM/EDS was used to analyze the SGM from the no addition treatment. The no addition treatment was chosen considering that the lowest defluorination was observed. FIG. 8 shows that the sodium thiosulfate addition treatment decreases to zero, theorizing that all aqueous fluoride bonded to the SGM. Therefore, if fluoride was observed in the SGM of the no addition treatment, it is theorized that this trend is also present in the treatments with more defluorination. FIG. 11 is of the no addition SGM after being in contact with the 50 mg/L PFOS solution in the presence of UV light after 60 min. The cross section of the no addition SGM shows an elemental mapping overlay of both Si and F in backscattered electron (BSE) mode. FIG. 12, also in BSE, separates the elemental overlay into the individual elements, showing that the hot spots of fluoride directly correlate with the silicon pattern.

Figure 13:
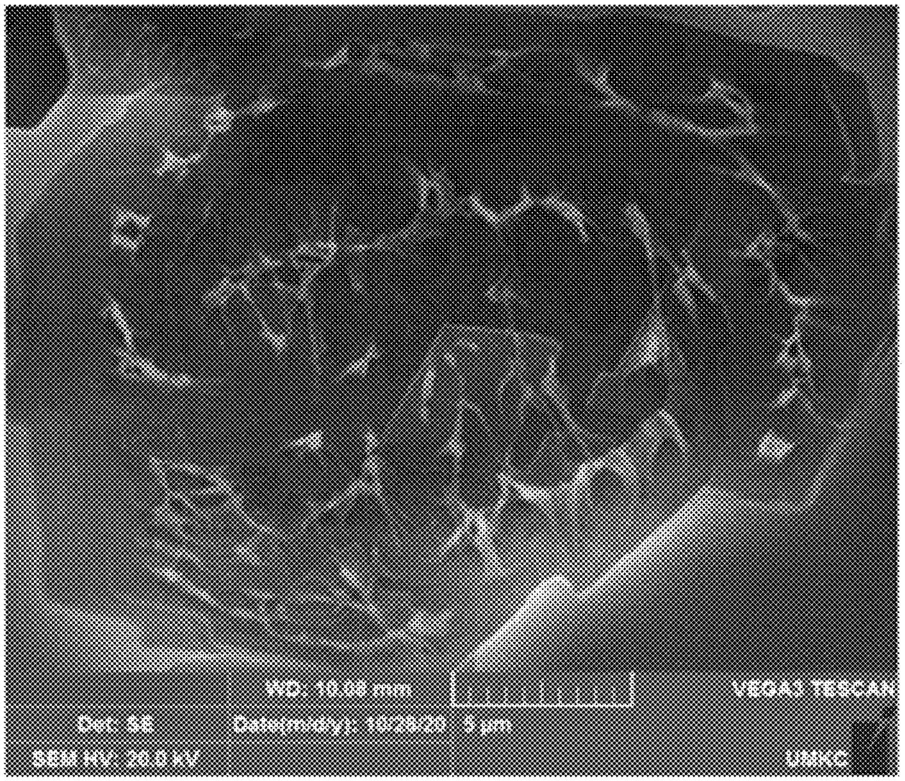
FIG. 13 is an SEM image in SE mode showing precipitated C—F in the SGM.
Figure 14:
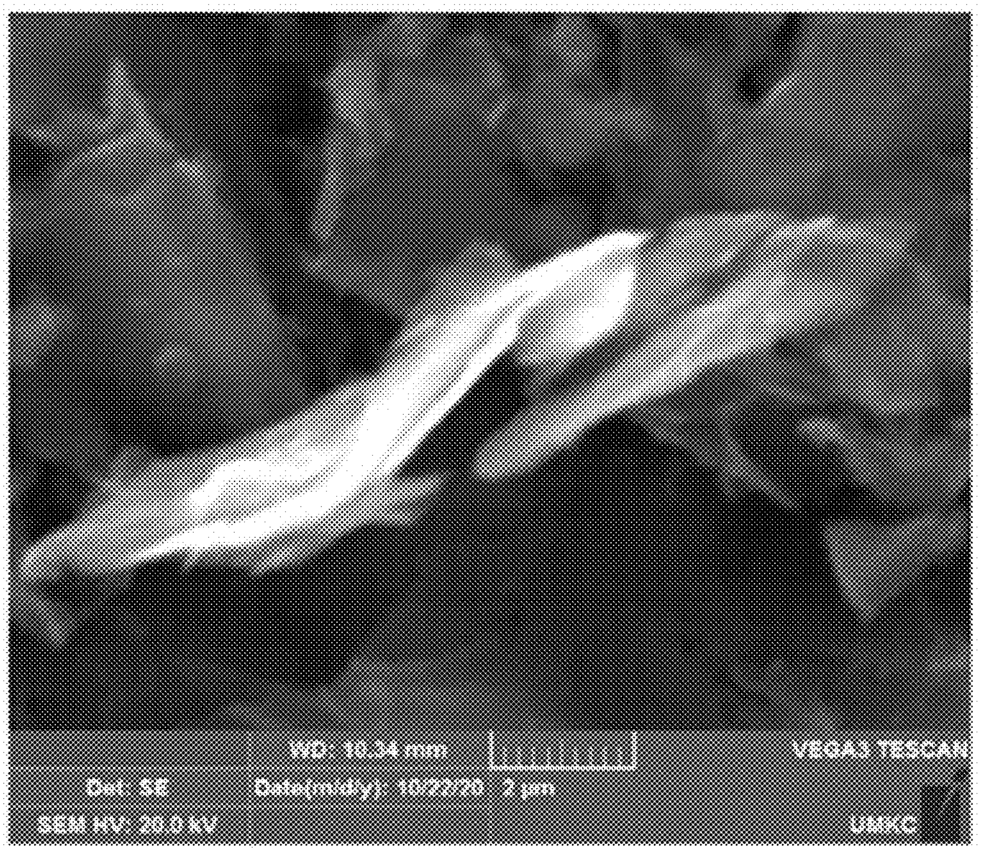
FIG. 14 is a zoomed-in SEM image in SE mode showing the cleavage of precipitated, agglomerated C—F chains in the SGM.

After confirming that the fluoride was present in the SGM, further SEM forensic analysis was performed to detect the possible presence of precipitated by-products in the SGM. Considering the relative size difference of angstrom-scale PFOS compared to the SGM, precipitates of by-products and fluoride were found by zooming in on hot spots of fluoride and toggling between elemental mapping. Once an area could be verified as C—F chains, the SEM was switched to secondary electron (SE) mode to achieve clearer imagery. FIG. 13 depicts the precipitated C—F chains agglomerated together and attached to the SGM, and sulfur was shown to be dispersed throughout elemental mapping, validating that the sulfate functional head had been removed. Upon zooming in on the C—F chains, breaking or cleaving of the agglomerated chains can be seen in FIG. 14.

Figure 15:
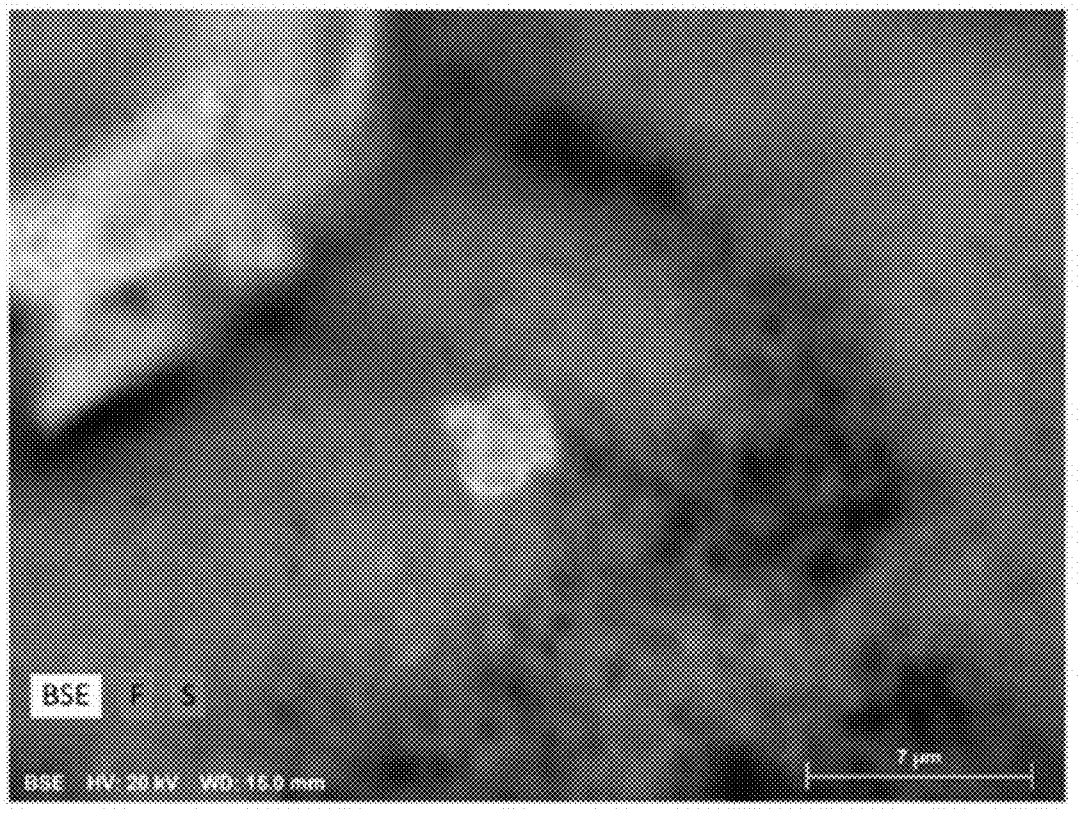
FIG. 15 is an SEM backscatter image with EDS elemental mapping of precipitated fluoride in the SGM.

Initial SEM/EDS imagery confirmed that the by-products have an affinity to diffuse into the SGM and continue to degrade. To detect precipitated or mineralized fluoride after it breaks from the C—F chains and renters the SGM, further SEM analysis was performed. A no addition treatment SGM specimen was selected that had been in contact with the 50 mg/L PFOS in the presence of UV light for 120 min. According to the IC analysis presented previously, aqueous fluoride should have re-entered the SGM at this time. FIG. 15 shows elemental mapping of a 30-μm section of SGM. Fluoride has crystallized after precipitating within the SGM.

Figure 16:
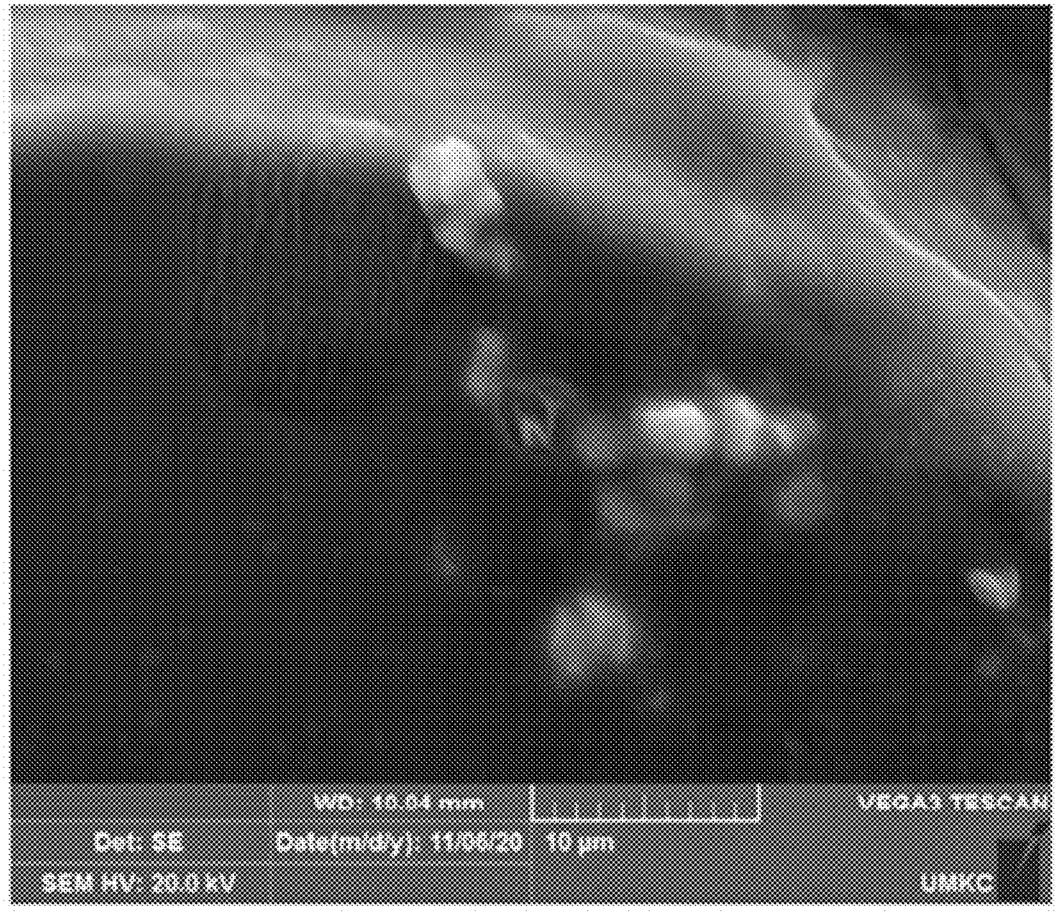
FIG. 16 is an SEM image of precipitated C—F chains and precipitated fluoride in SE mode.
Figure 17A:
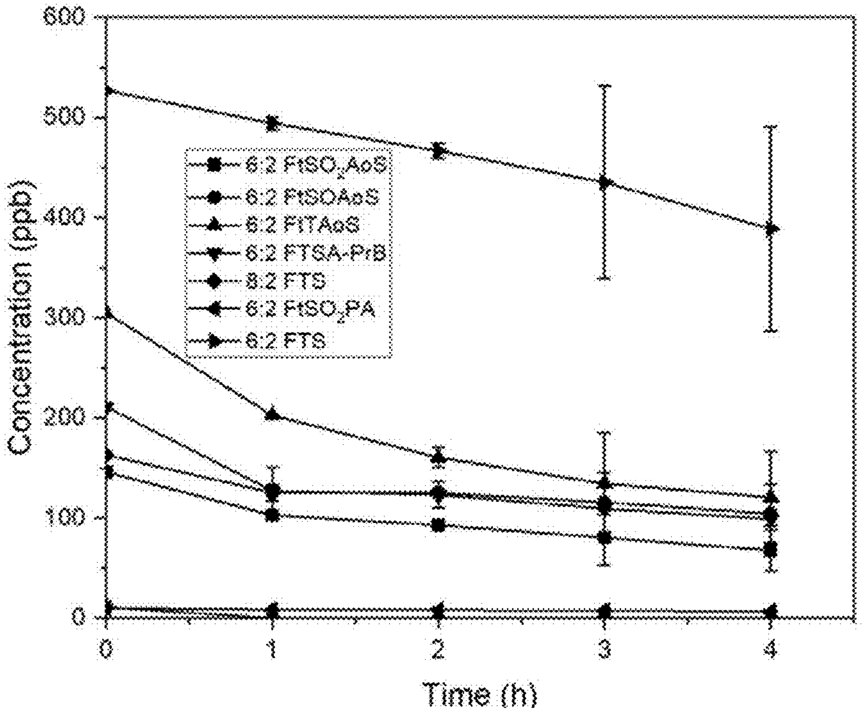
FIG. 17 are graphs showing the degradation of PFAA precursors over four consecutive column reactors with Treatments A, B, C, and D.
Figure 17B:
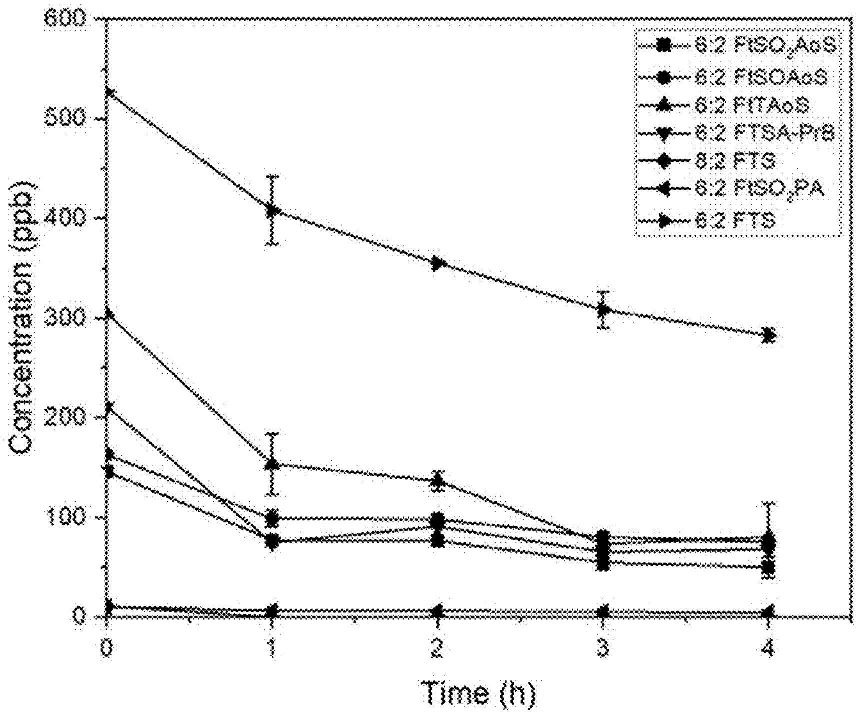
Figure 17C:
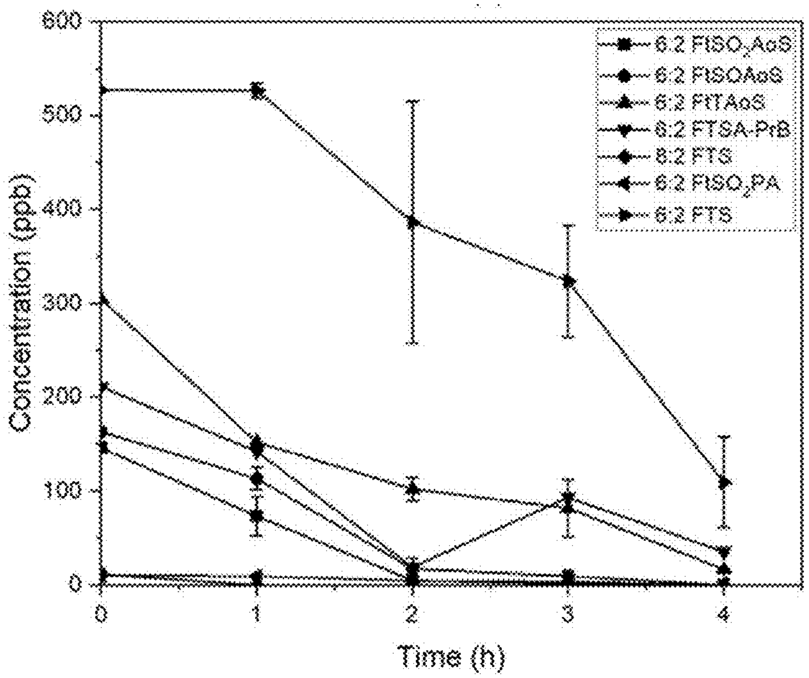
Figure 17D:
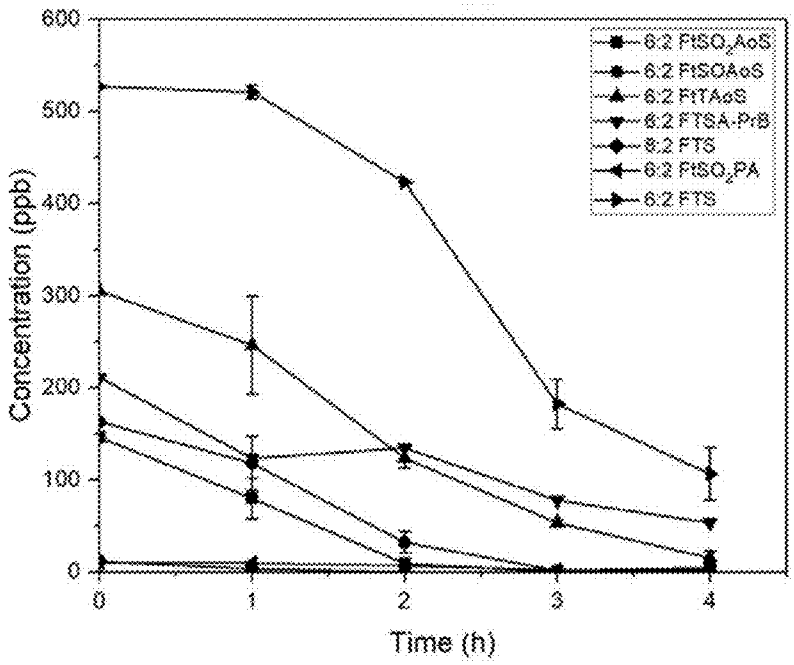
Figure 18A:
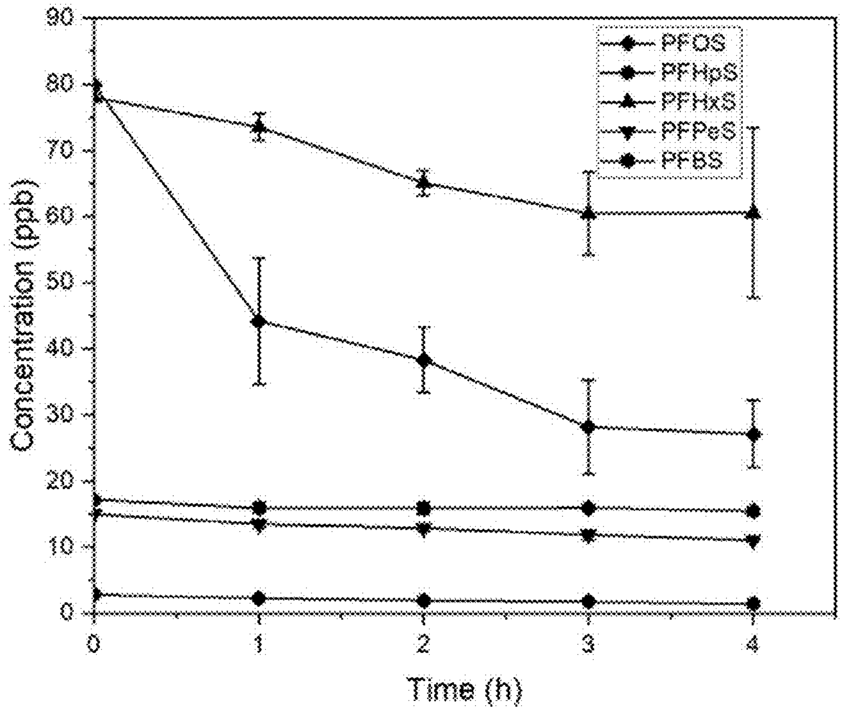
FIG. 18 are graphs showing the degradation of PFSAs over four consecutive column reactors with Treatments A, B, C, and D.
Figure 18B:
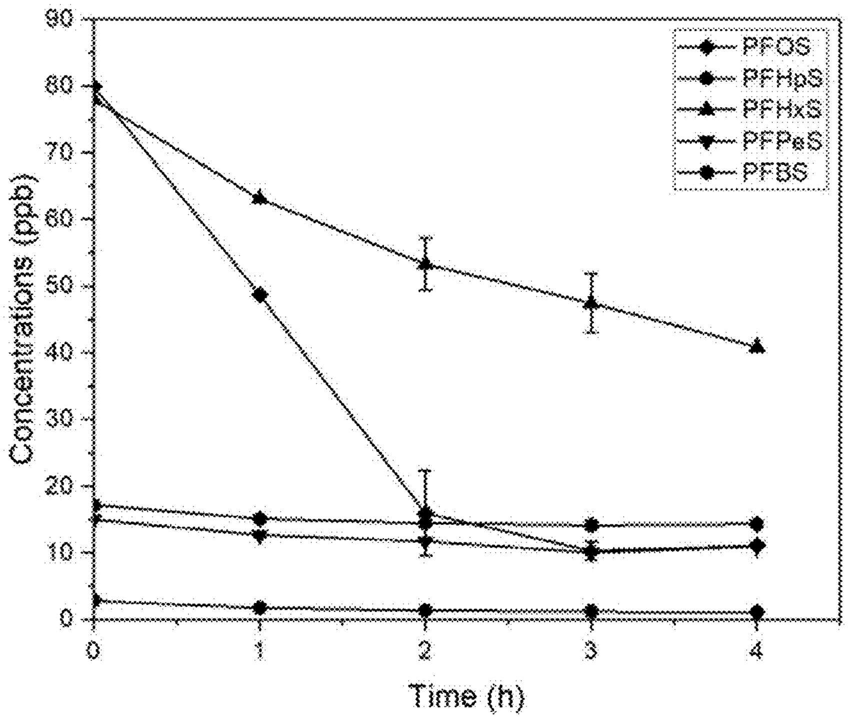
Figure 18C:
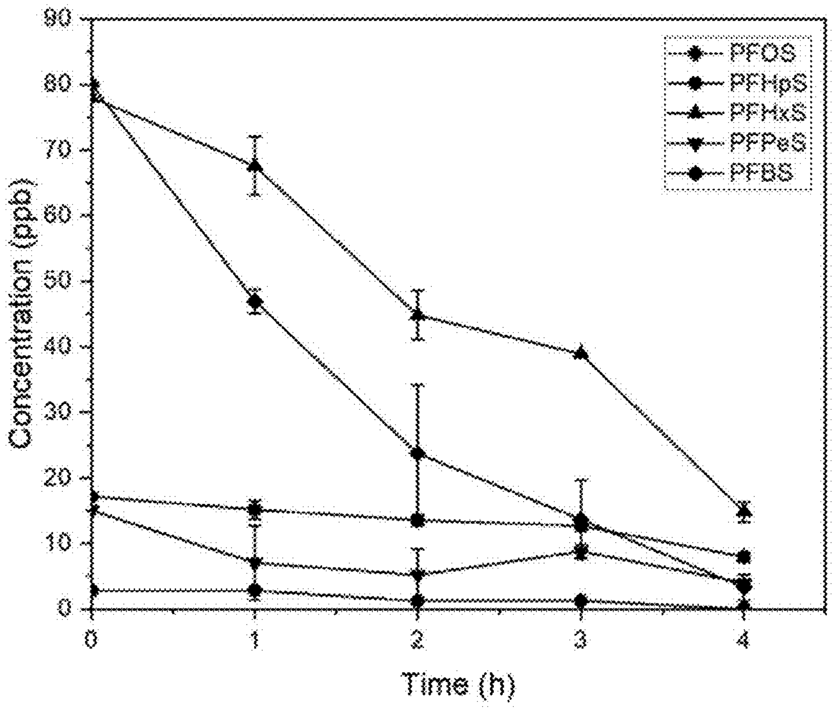
Figure 18D:
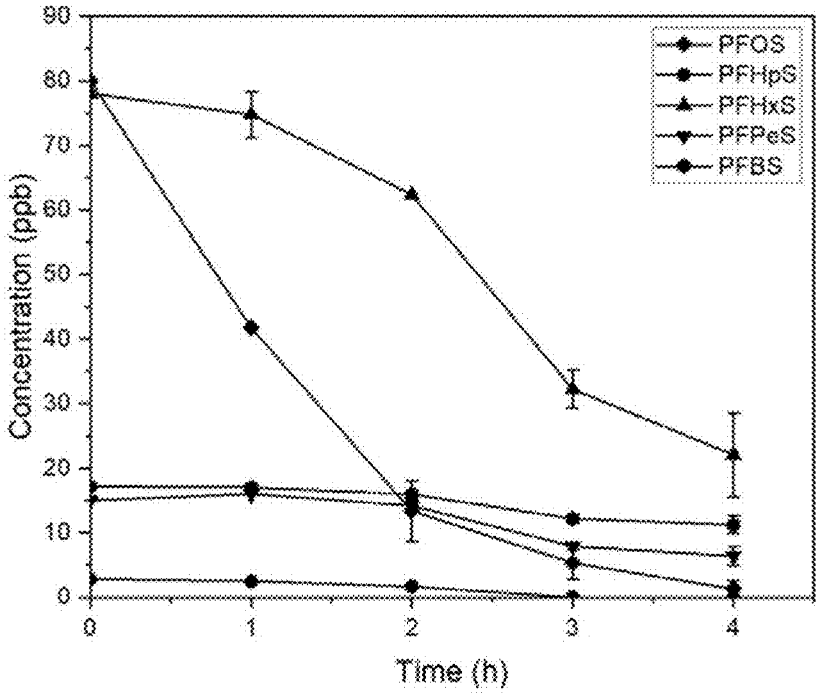
Figure 19A:
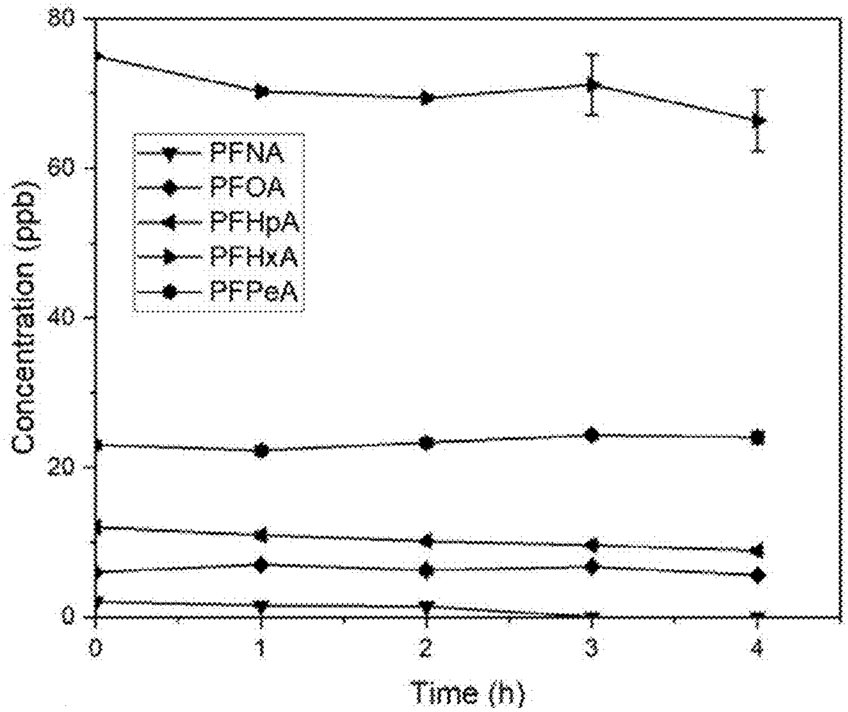
FIG. 19 are graphs showing the degradation of PFCAs over four consecutive column reactors with Treatments A, B, C, and D.
Figure 19B:
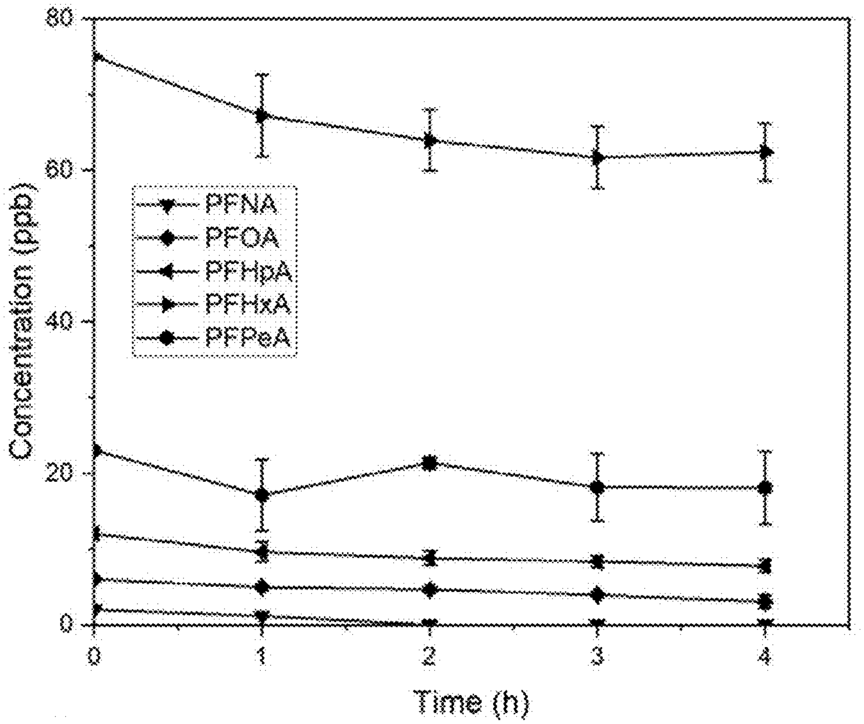
Figure 19C:
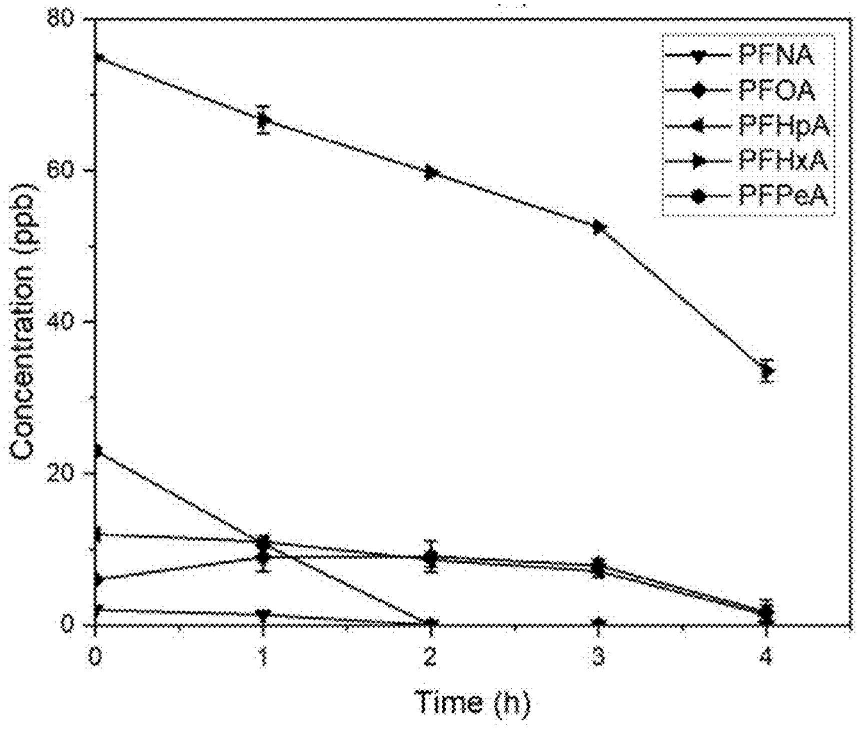
Figure 19D:
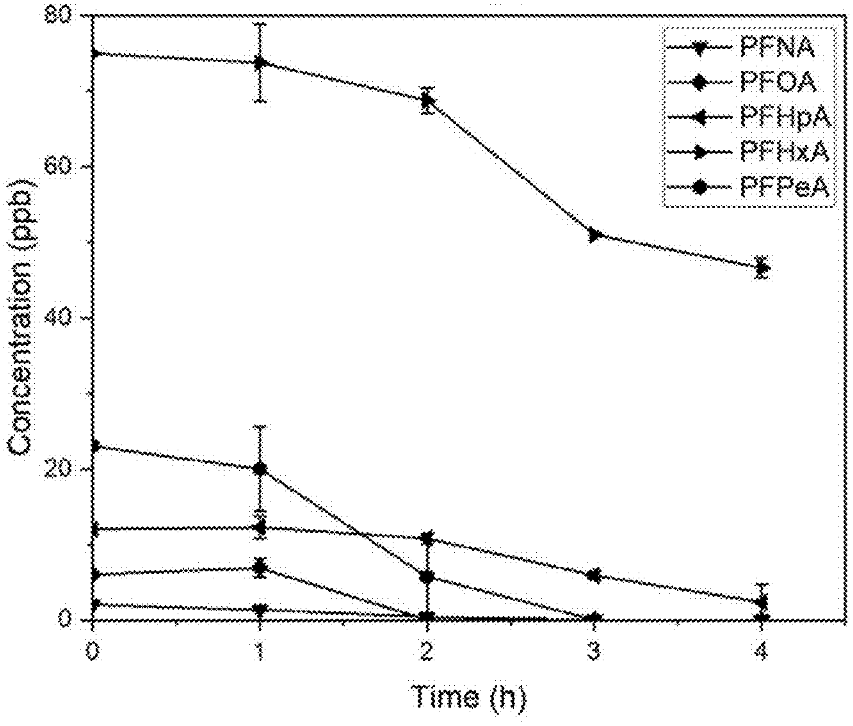

Fluoride precipitates tend to form a nucleation site for other fluoride to precipitate out, and FIG. 16 depicts this tendency. Some amalgamated C—F chains are also present in FIG. 16, validating that there is not 100% defluorination after 120 min in the no addition treatment.

Example 2a: Column Reactor Experiment

An SGM was developed using tetraethyl orthosilicate as the alkoxide precursor and titanium dioxide as the photocatalyst. Sodium hydroxide was introduced after formation of the polymer network as the foaming agent. The media was then fired. The resulting SGM was washed in a weak acid to dissolve surficial sodium hydroxide and bring the external surface of the SGM to a neutral pH.

Multiple column reactors were constructed to determine optimal SGM treatment conditions and reaction kinetics and assess scalability. Four variations of amended SGM (denoted Treatment A-D) were compared against four controls:

Treatment A: All four columns were packed with SGM without amendments.

Treatment B: All four columns were packed with SGM, which was preloaded with sodium thiosulfate within the internal pore space.

Treatment C: A lead column was filled with a highly basic media containing NaOH, followed by subsequent columns two through 4 (2-4), which contained unamended SGM.

Treatment D: A lead column was packed with a high pH media, followed by subsequent columns two through four (2-4), which were packed with SGM that was preloaded with sodium thiosulfate.

Each experimental treatment was conducted over the course of four hours within each column providing one hour of contact time, so that treatment variables could be compared at different contact times as well as amendment types.

High basicity columns (Treatments C and D) were packed with a lightweight porous aggregated preloaded with sodium hydroxide. All amendments were preloaded into their respective media by soaking them in 1 M solutions of NaOH or $Na_2S_2O_3$ for 72 hours prior to testing. Following loading of the SGM with $Na_2S_2O_3$, media was placed in a 105° C. oven and allowed to dry for 72 hours. Drying the media in this manner left residual salt precipitates within the pore space, which then rehydrated in contact with the filtrate solution. The lightweight aggregate media soaked in high pH solutions were decanted, dried to saturated surface dry conditions to minimize dilution effects, and then packed within the column prior to proceeding with experiments.

Columns were assembled in a series of four DWK LIFE SCIENCES KIMBLE KONTES FLEXCOLUMN Economy Columns. Each column measured 15 mm in diameter, 200 mm long, and held a volumetric capacity of 35 mL. Once packed, columns were oriented in parallel such that a 20-μm pore size filter disc was positioned in the outlet of each column to prevent media migration, plugging of tubing, or fouling of sampling ports. Glass components of the column bodies were manufactured from 33 expansion, low extractable borosilicate glass conforming to USP Type I and ASTM E438, Type I, Class A requirements. 33 expansion borosilicate glass has a low-potassium content in order to yield a very high UV transmission, second only to quartz-based glass in UV transmission. Each column was assembled in an up-flow reactor configuration to release trapped air within each column reactor. At the outlet and inlet of each reactor a three-way stopcock valve was installed, with each outlet valve connected to the next inlet valve by high density polyethene tubing. Each series of four columns was leveled and fixed to a UNISTRUT rack system. SAVIO Skimmer UV lights (57-Watt lamps) from AQUA ULTRAVIOLET were placed on either side of each column. A 100-mL polypropylene syringe was filled with the aqueous film forming form (AFFF)-impacted stormwater and attached to a NE-300 JUST INFUSION syringe pump.

Each column was packed with 10 grams of granular media yielding an average pore volume of 20 mL. Therefore, the syringe was set to pump at 20 mL/h allowing for a sample aliquot to be taken from the effluent of the column after an hour. In Treatments C and D, a full packed pore volume of filtrate (20 mL) was passed through the reactor prior to the start of the experiment, in order to mitigate the impact of dilution of the waste stream by NaOH solution. The second filtrate pore volume (initial 20 mL plus subsequent 20 mL) was sampled and reported. To facilitate direct comparison of results, data presented below are representative of the second pore volume of filtrate. After flushing of residuals was completed, discrete sample aliquots were collected at the outlet sampling port of each column every hour for four hours. Samples were stored in compatible polypropylene micro-centrifuge containers at 4° C. until analysis. All experiments were performed in duplicate with minimum and maximum values reported as observed.

Example 2b: Column Reactor Sample Preparation and Analysis

Modified methods ASTM 7979 and EPA 537 were followed for sample preparation and LC-MS analysis of PFAS. Each sample aliquot was centrifuged for 20 minutes at 14,000 revolutions per minute (rpm) while maintained at a temperature of 4° C. Aliquots of 20 μL were added to 180 μL of solvent S (1:1 MeOH/H2O+0.1% glacial acetic acid) that contained 0.01 μg/mL of MPFAC (WELLINGTON LABORATORIES) as the internal standard. The mixture was vortexed for 30 seconds and again centrifuged. The supernatant was injected into the LC-MS system. In addition to the internal standard, one sample in each batch was performed in duplicate to ensure statistically invariance.

Separation of analytes was carried out on a SHIMADZU Nexera XR (40-Series) UHPLC system by injecting 5 μL of sample into a RESTEK Raptor ARC-18 analytical column (100 mm length, 2.1 mm internal diameter, 1.8 μm particle size, 90 Å pore size). Gradient elution of 25 mM solution of ammonium acetate in water containing 3% (v/v) acetonitrile (solvent A) and 100% acetonitrile (solvent B) at a flow rate of 0.35 ml/minute was used as the mobile phase. The gradient began with isocratic flow of 5% solvent B for the first 3 minutes which was followed by a linear gradient of 5% to 95% solvent B from 3 to 28 minutes; the gradient decreased to 5% solvent B at 28.1 minutes and maintained constant until the minute 30. The autosampler and the column were maintained at 4° C. and 40° C., respectively, during analysis.

Untargeted analysis and further detection of PFAS reduction in sample aliquots was performed on a SHIMADZU 9030 Q-TOF Mass Spectrometer coupled to the UHPLC system. The mass spectrometer was equipped with a DUIS ionization source and was operated in negative ionization mode. Concentration calibrations were developed and quantified using WELLINGTON LABORATORIES standards and quantified on the LC-QToF-MS. Relative concentrations were determined for all analytes not found in the standards.

Aqueous fluoride was measured using a DIONEX ion chromatography system (ICS-90). Individual samples of 0.5 mL were diluted to 5 mL with DI water in order to reduce the solution pH below 9. If the pH of the sample was greater than 11, the 0.5 mL aliquot was diluted in 0.1 M nitric acid. Sample and standard preparation and analysis, along with quality control samples, were consistent with EPA Method 300.0.

Example 2c: Column Reactor Results

Characterization of Stormwater

The stormwater was analyzed on a LC-QToF-MS for PFAS discussed in this section. Table 1 summarizes the identified PFAS and their concentrations in untreated stormwater. Untargeted analysis identified 17 possible PFAS through suspect screening. Of the 17 identified PFASs, 11 were PFAAs and 7 were PFAA precursors. Fluorotelomer sulfonates accounted for 83% of PFAS mass in the stormwater, while PFSAs and PFCAs accounted for 17% of the total PFAS, 10% and 7% respectively. Fluorotelomer sulfonates can transform into biologically inert PFAAs. External lab testing verified the presence of the 204 PFSAs, PFCAs, 8:2 FTS, and 6:2 FTS (Table 1). Studies have shown 6:2 fluorotelomer thioamido sulfonate (6:2 FtTAoS) is one of the primary PFAS present in AFFF from multiple manufacturers. Biotransformation of the manufactured compounds was predicted based on the large concentration of 6:2 FTS. Two known transformation products were detected—6:2 fluorotelomer sulfoxide amido sulfonate (6:2 FtSOAoS) 208 and 6:2 fluorotelomer sulfone amido sulfonate (6:2 FtSO2AoS). Further transformation into PFCAs likely occurred, based on the relatively high concentrations of perfluorohexanoic acid (PFHxA) and perfluoropentanoic acid (PFPeA). 6:2 fluorotelomer sulfonyl propanoic acid (6:2 FtSO2PA) has previously been reported in AFFF-impacted waters and has been identified as a fluorosurfactant ingredient utilized in some AFFF mixtures. 6:2 fluorotelomer sulfonamido propyl betaine (6:2 FTSA-PrB) has been identified at multiple sites and is another fluorosurfactant used in AFFF to replace 215 PFOS. No other 8:2 fluorotelomers and no 4:2 fluorotelomers were identified. In addition to the fluorotelomers identified, a large concentration of PFSAs were identified. No other PFAS were identified in the parts per billion (ppb) range; however, it is possible for other compounds to be present at lower concentrations. Based on the presented compounds, it is likely that multiple AFFF mixtures were released at the site. This is a common scenario at many AFFF sites where multiple products and formulations were used over time.

TABLE 1

PFAS Analytes and Concentrations in AFFF-Impacted Stormwater

| Analyte | n⁺ | Molecular Ion Formula | Theoretical m/z | Observed m/z | Mass Error (ppm) | Concentration (ppb) |
|---|---|---|---|---|---|---|
| 6:2 FtSO2AoS | 6 | $C_{15}H_{17}F_{13}NO_6S_2^-$ | 618.02897 | 618.02746 | 2.4465 | 146 ± 11* |
| 6:2 FtSOAoS | 6 | $C_{15}H_{17}F_{13}NO_5S_2^-$ | 602.03405 | 602.03255 | 2.5032 | 163 ± 12* |
| 6:2 FtTAoS | 6 | $C_{15}H_{17}F_{13}NO_4S_2^-$ | 586.03914 | 586.03768 | 2.4947 | 305 ± 26* |
| 6:2 FTSA-PrB | 6 | $C_{15}H_{18}F_{13}N_2O_4S^-$ | 569.0779 | 569.07646 | 2.5304 | 211 ± 6* |
| 6:2 FtSO2PA | 6 | $C_{11}H_{18}F_{13}O_4S^-$ | 526.96096 | 526.95949 | 2.8048 | 10 ± 2* |
| 8:2 FTS | 8 | $C_{10}H_4F_{17}O_3S^-$ | 482.9936 | 482.99198 | 3.3541 | 11 ± 3* |
| 6:2 FTS | 6 | $C_8H_4F_{13}O_3S^-$ | 426.96735 | 426.96611 | 2.9183 | 866 ± 18 |
| PFOS | 8 | $C_8F_{17}O_3S^-$ | 498.92966 | 498.9284 | 2.5414 | 80 ± 1 |
| PFNA | 8 | $C_9F_{17}O_2^-$ | 462.96268 | 462.96167 | 2.1838 | 2 ± 0.1 |
| PFHpS | 7 | $C_7F_{15}O_3S^-$ | 448.93286 | 448.93197 | 1.9869 | 2.8 ± 0.5 |
| PFOA | 7 | $C_8F_{15}O_2^-$ | 412.96587 | 412.96465 | 2.9663 | 6 ± 0.4 |
| PFHxS | 6 | $C_6F_{13}O_3S^-$ | 398.9361 | 398.9349 | 2.8476 | 78 ± 0.5 |
| PFHpA | 6 | $C_7F_{13}O_2^-$ | 362.9691 | 362.9678 | 3.4135 | 12 ± 0.1 |
| PFPeS | 5 | $C_5F_{11}O_3S^-$ | 348.9392 | 348.9383 | 2.7225 | 15 ± 0.5 |
| PFHxA | 5 | $C_6F_{11}O_2^-$ | 312.9723 | 312.9731 | 2.5466 | 75 ± 0.5 |
| PFBS | 4 | $C_4F_9O_3S^-$ | 298.9424 | 298.9416 | 2.7564 | 17 ± 0.6 |
| PFPeA | 4 | $C_5F_9O_2^-$ | 262.9755 | 262.9748 | 2.4223 | 23 ± 0.3 |

*Semi-quantitative analysis was performed on these analytes

⁺number of perfluroinated carbons in the molecule

PFAS Degradation During Treatment

All 17 PFAS identified in the stormwater were evaluated over the four-hour experiments. FIGS. 17-21 depict the degradation of fluorotelomers, PFSAs, and PFCAs over four different treatment variations utilizing SGM. FIG. 17 shows the observed removal of fluorotelomers in each of the four treatments A-D. Treatment A showed that the sum of all fluorotelomers was degraded by 20% after one hour and over 50% after 4 hours. Treatment B showed comparable results after 4 hours; however, a 20% higher degradation was observed in the first hour, with slower rates over the following three. Treatments C and D achieved the most degradation with >88% degradation in Treatment C and >93% degradation in Treatment D after 4 hours. In Treatment D, the only fluorotelomers that were not reduced to non-detect levels were 6:2 FtTAoS (2% remaining), 6:2 FTSA-PrB (25% remaining), and 6:2 FTS (17% remaining). In Treatments A and B, all fluorotelomers had linear degradation rates. In Treatment C and D, 6:2 FTS did not begin to degrade until between hours 1-2, and in fact increased after one hour in Treatment C. However, rapid degradation occurred after one hour. This occurs because column 1 in treatment C and D is a high pH column therefore, the solution is being flooded with hydroxyls, but there is no photocatalytic attack. This validates that the coupled attack is needed to optimize degradation.

The degradation of PFSAs, depicted in FIG. 18, showed similar degradation trends to the fluorotelomers in FIG. 17, with more rapid degradation in Treatments C and D. Treatment A, which was SGM only, had a reduction of PFSAs that was just over 40%, with a 57% removal of PFOS. The addition of a weak nucleophile, sodium thiosulfate, in Treatment B resulted in an overall PFSAs degradation of 54%. There was minimal removal of PFHxS in Treatment A; Treatment B yielded a reduction of 48% of PFHxS. In addition, 88% of PFOS was removed in Treatment B. The greatest PFSA reductions occurred in Treatments C and D with overall removal of 84% observed in both. Less than 4% of PFOS remained in Treatment C, while there was no detection in Treatment D. Treatment A exhibited much lower levels of PFSA reduction compared to the nucleophilic addition treatments; however, no existing photocatalytic technology demonstrates the ability to degrade PFOS, at least at this concentration, and with such high removal capacity. Without being bound to a particular theory, it is believed that the PFOS degradation can be attributed to the intrinsic properties of SGM, namely free hydroxyls diffusing from the internal pores of the polymer matrix and creating reductive conditions in the permeate, which has been shown to accelerate degradation kinetics of PFSAs. The reaction rates and temporal trends of each analyte can be supported by the adsorption capacity of the PFSAs to the SGM. PFOS has the highest adsorption capacity, therefore, the highest degradation rate. This is attributed to photocatalytic technologies having an adsorption-dependent mechanism for free radical transport. As the rate of adsorption decreases, the degradation rate decreases, this is demonstrated the most in Treatment B. There, PFOS degrades over 75% in the first two hours but shows little degradation in the following two hours. One way to increase the adsorption capacity would be to create a positive charge on the surface area of the SGM using an acidic after the first 2 hours. Doing so would not only allow more PFAS to adsorb, but it would increase the degradation rate of PFCAs.

PFCAs constituted the lowest concentration of PFAS in the untreated stormwater. FIG. 19 shows the removal of PFCAs over the four treatments (A-D). Slower removal rates of carboxylates can be attributed to degradation of PFAA precursors and PFSAs into PFCAs, along with the decreased efficiency of PFCA degradation in reductive conditions versus oxidative. However, total carboxylates were still significantly reduced in Treatments C and D. Treatment A yielded only a 10% reduction in all PFCAs, and an increase in PFHXA and PFPeA concentrations was observed during treatment. PFHXA and PFPeA are known degradation products of 6:2 FTS55, one of the predominant compounds in the stormwater. Treatment B resulted in a higher reduction of PFCAs (20%) but showed similar trends in PFHxA and PFPeA concentrations. More successful removal of PFCAs occurred in Treatments C and D with 79% and 63%, respectively.

Example 2d: Controls

In addition to the four treatments, a series of controls were performed on the mini-column reactors to help identify the reaction mechanisms occurring in the system. Variables of the treatment system included adsorption to column reactor, adsorption to SGM, UV photolysis, photocatalysis, nucleophile addition, and heat from the lamp. Results from three of the controls are depicted in FIG. 20A.

The first control, denoted as No UV/No SGM, quantified PFAS adsorption to the column reactor. This control column yielded a 13% decrease in PFAS in the first pore volume of solution after running through all four columns. Although a significant decrease was observed, the effect was only observed during the first pore volume flush, validating the explanation that all available sorption sites in the reactor are fully utilized during the first pass of solution. Therefore, since the treatment data depicted in FIGS. 17-20 utilized the second pore volume, minimal reduction is attributed to adsorption to the system.

Figure 20A:
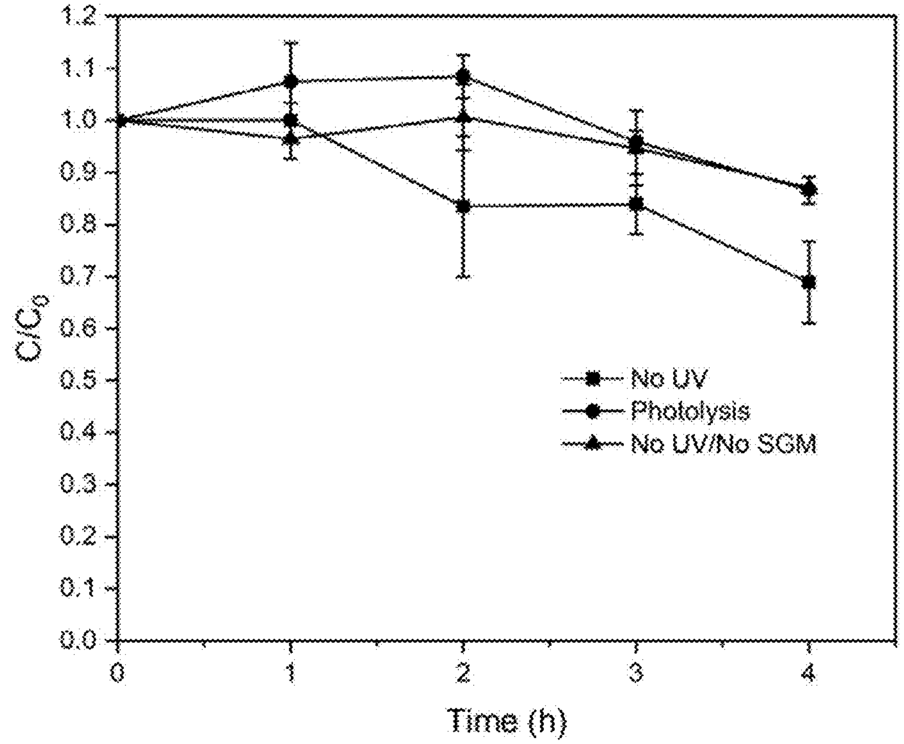
FIG. 20A is a graph of PFAS reduction over treatment time of column reactor controls.
Figure 20B:
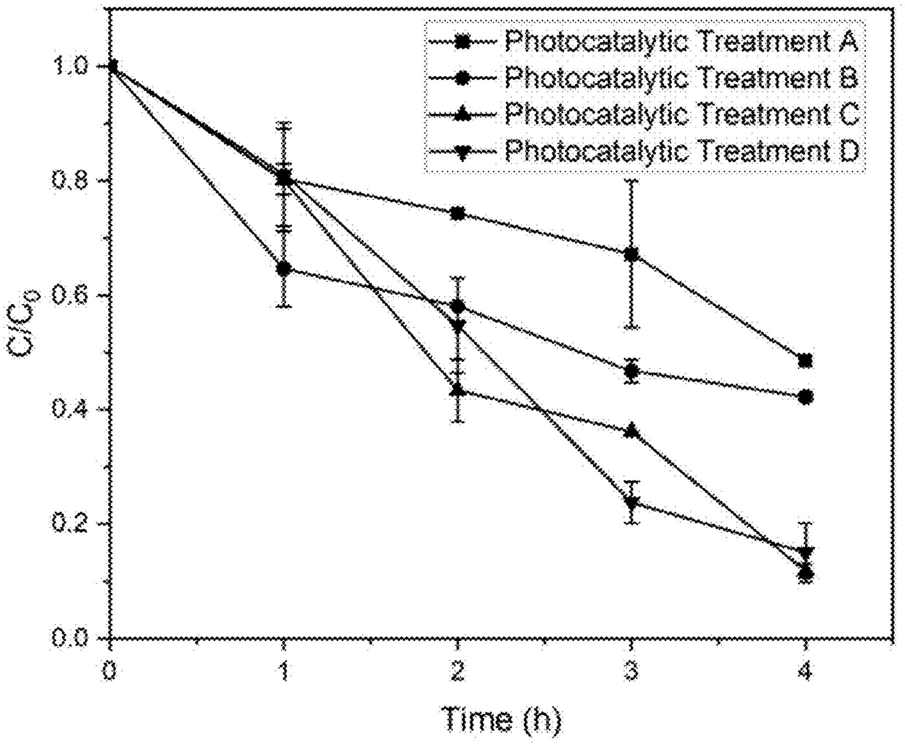
FIG. 20B is a group of PFAS reduction over treatment time of total degradation of PFAS in Treatments A, B, C, and D.

The second control consisted of stormwater passed through the column reactor with UV lamps on and is labeled as photolysis in FIG. 20A. The data exhibited a similar reduction of PFAS by column 4 for the first pore volume, consistent with the decrease anticipated in this control from sorption Minimal reduction was shown in the second pore volume, providing evidence that photolysis did not significantly contribute to the degradation of most PFAS in the stormwater (PFSAs and PFAA precursors). PFCAs can easily degrade due to photolysis; however, PFCAs comprise a small fraction of the influent PFAS. Photolysis could enhance PFCA degradation once the column reactor design is scaled up, as the UV lamp will likely be encased in a quartz sleeve and inserted into the column with SGM packed around it.

Figures 21A, 21B:
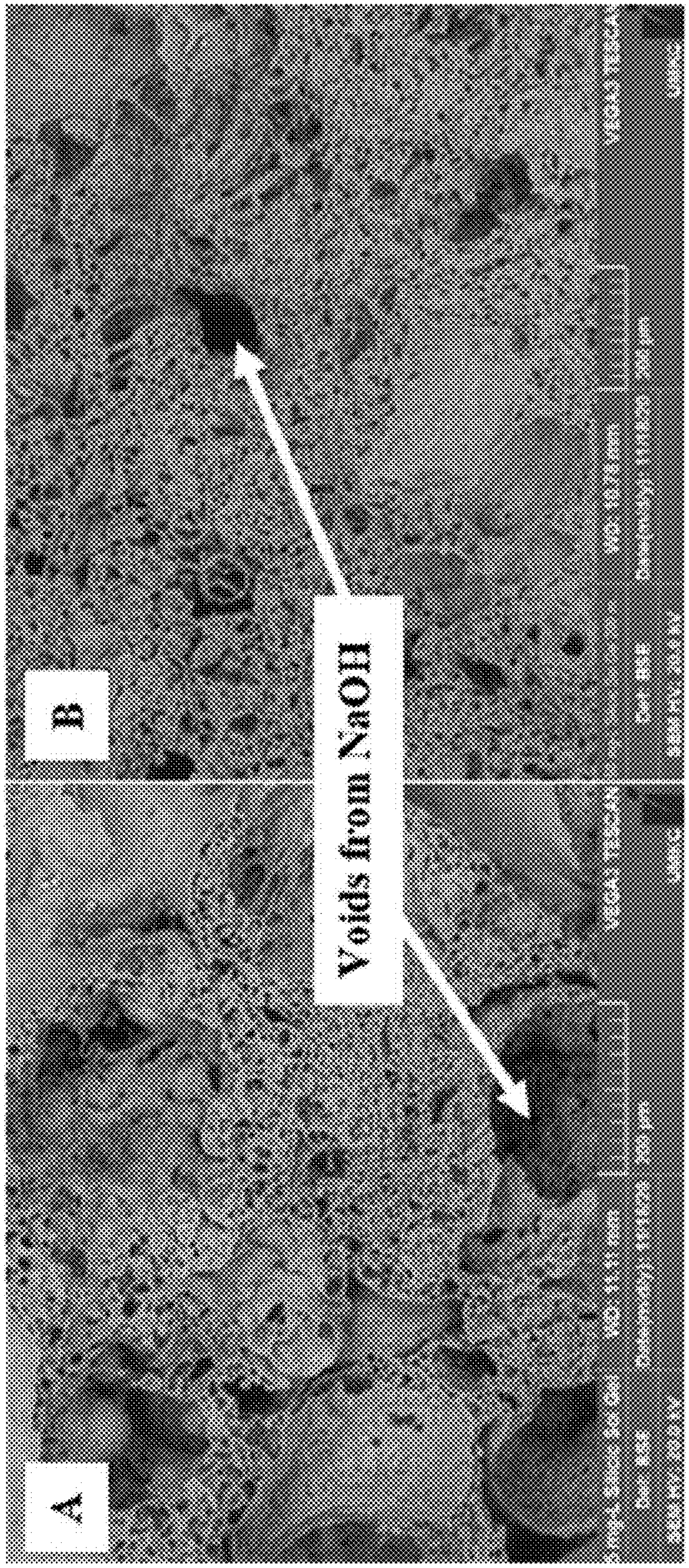
FIG. 21A is an SEM image of silica variations in SGM with 5 mg/L silicic acid.
FIG. 21B is an SEM image of silica variations in SGM with 50 mg/L silicic acid.
Figure 21C:
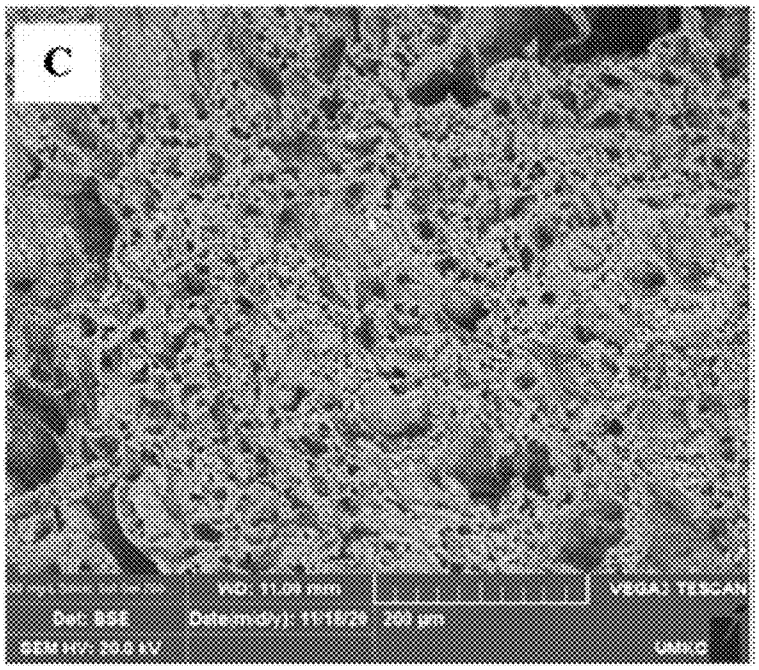
FIG. 21C is an SEM image of silica variations in SGM with 500 mg/L silicic acid.
Figure 21D:
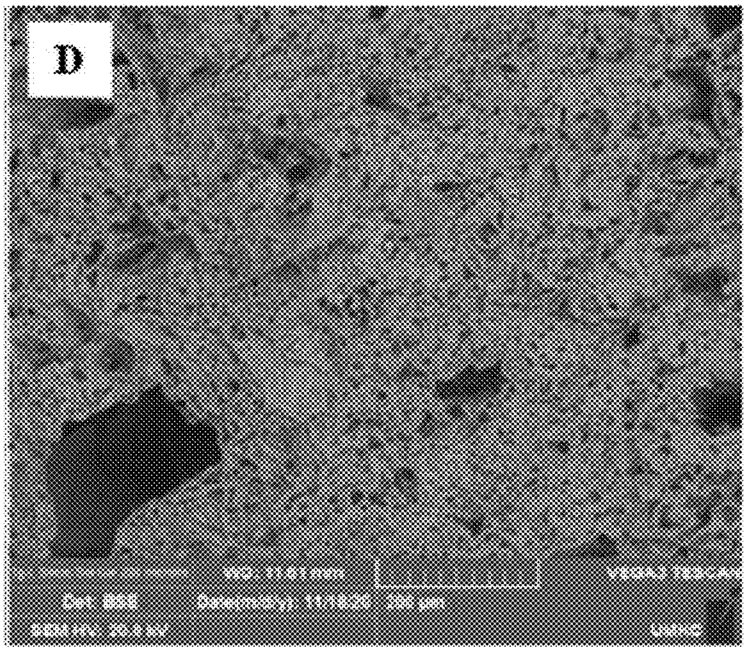
FIG. 21D is an SEM image of silica variations in SGM with 1000 mg/L silicic acid.

The third and most important control is PFAS adsorption to SGM media without UV activation, denoted No UV in FIG. 21A. SGM is composed of Si—O—Si bonds with titanium immobilized throughout the matrix. Silica-based media was preferred with the objective of increasing the amount of shorter chain PFAS adsorbed and decreasing the recombination rate of $e^{-}/h^{+}$ pairs before the degrading the PFAS. Therefore, an adsorption-dependent mechanism was sought for optimal degradation of PFAS. The No UV control data yielded a 30% reduction in PFAS by the end of the fourth column. Percent reduction decreased with each successive pore volume, providing evidence that the PFAS sorbs to available silica or titanium on the SGM and as degradation has completed, new PFAS can sorb.

A fourth control was performed to determine the effect of heat from the lamps on experimental data. Equivalent heat result without irradiation yielded a 5% reduction in PFAS compared to data collected during the No UV control. This can be attributed to residual nucleophiles in the SGM from the foaming agent reacting with the heat to aid in PFAS degradation. However, results indicate that PFAS degradation is predominantly from photocatalytic treatment and is enhanced by the addition of more nucleophiles.

A summary of total PFAS degraded in all four treatments is shown in FIG. 21B. Treatment B shows slightly higher degradation percentages compared to Treatment A, which is attributed to the addition of the weak nucleophile. PFAA precursors and PFSAs were observed to degrade more rapidly with the addition of sodium hydroxide in Treatments C and D. The addition of the two nucleophiles in Treatment D did not out-perform Treatment C and was a more complicated system. Therefore, Treatment C shows the most promise with 90% degradation of all PFAS in 4 hours. The long residence time is needed because of the adsorption-dependent mechanism which requires PFAS to sorb to the SGM before being irradiated. For comparison, a 50 mg/L surrogate solution of PFOS was degraded by >65% with no nucleophile addition in one hour and >90% of PFOS was degraded with sodium thiosulfate preloaded into the SGM pore space in one hour. While Treatment C yielded very promising results for PFAA precursors and PFSAs, PFCAs degraded at a much slower rate than oxidative conditions. More rapid degradation of all PFAS could be obtained by degrading all PFAA precursors and PFSAs into PFCAs under reductive conditions and then using oxidative conditions to degrade the PFCAs, which would require a pH adjustment.

Example 2e: Defluorination of PFAS

Aqueous fluoride in solution was measured in the effluent of each column reactor. A theoretical organic fluoride content of 1065.83±39.33 ppb was calculated from the 17 identified PFAS compounds; however, other unidentified fluorinated compounds could be present in the stormwater.

Table 2 presents the average aqueous fluoride for each treatment over the 4-hour reaction period. While it may be assumed that the fluoride will continually increase over the four hours, with the fourth column effluent yielding the sum of total defluorination, free fluoride in solution has shown the ability to bond to free silica in the SGM. This was verified by fluctuating fluoride concentrations between each column reactor in the stormwater (Table 2). The high affinity of silica to fluoride results in fluoride mineralization by bonding to silica and therefore total defluorination cannot be quantified without a complete fluoride mass balance within the stormwater and SGM. However, high concentrations of aqueous fluoride were still measured, validating degradation and defluorination of PFAS in the stormwater. In Treatments C and D, defluorination of fluorotelomers is assumed because the measured fluoride is above the theoretical fluoride concentration of 209.32±3.16 ppb available from the PFSAs and PFCAs. All treatments showed recoverable aqueous free fluoride concentrations greater than the theoretical amount of the PFCAs, indicating defluorination of PFSAs and PFAA precursors. The minimum defluorination in each treatment can be determined from the theoretical organic fluoride calculated and the aqueous fluoride recovered in the column 4 effluent. The average minimal defluorination in Treatments A-D are 12.4%, 47.9%, 91.2%, and 69.6%, respectfully. The maximum aqueous fluoride recovery (1024.8 ppb) was seen in Treatment C. Maximum PFAS reduction in Treatment C after 4 hours was 90%, therefore, the theoretical amount of fluoride that could be liberated or defluorinated was 959.25 ppb, which would equate to 106.83% defluorination. This indicates the presence of some unidentified fluorinated compounds.

TABLE 2

| Aqueous Fluoride Recovery | | | | |
|---|---|---|---|---|
| | 1 h | 2 h | 3 h | 4 h |
| Treatment A | 86.2 ± 13.2 ppb | 82.5 ± 14.4 ppb | 140.8 ± 1.6 ppb | 132.2 ± 16.8 ppb |
| Treatment B | 139 ± 39 ppb | 141.9 ± 58.6 ppb | 318.3 ± 122 ppb | 510.1 ± 77.1 ppb |
| Treatment C | 244.1 ± 9.8 ppb | 372.2 ± 0.2 ppb | 318.7 ± 152.7 ppb | 971.9 ± 52.9 ppb |
| Treatment D | 292.7 ± 21.3 ppb | 571.3 ± 225.6 ppb | 584 ± 39.7 ppb | 742.3 ± 28.1 ppb |

Evidence of PFAS degradation during treatment was provided by the increase in PFCA intermediate transformation products and generation of fluoride. Stormwater used in this study had a complex and only partially characterized mixture of PFAS. PFAS adsorption to the SGM further complicated the ability to use trends in PFAS concentrations to understand the reaction mechanism.

Treatment C and D both exhibited rapid degradation of 6:2 FtSO2AoS, 6:2 FtSOAoS, 6:2 FtTAoS, 6:2 FTSA-PrB, and 6:2 FtSO2PA. A significant reduction of 6:2 FTS was also observed, but not until after column 1. Therefore, it is theorized that 6:2 fluorotelomers degraded to form 6:2 FTS. 6:2 fluorotelomer unsaturated acid (6:2 FTUA) was measured in the effluent of columns 1-4, but was not present in the initial solution, suggesting it formed during degradation of 6:2 FTS. Based on general concentration trends, 6:2 FTUA is thought to further degrade to form PFHXA and PFPeA. This pathway is also supported by relatively high concentrations of PFHxA and PFPeA in the initial solution, indicating that PFAA precursors may have already began biotransforming into PFCAs.

It is more difficult to trace the degradation pathway of PFSAs, due to complications from the solution matrix. SGM have previously been demonstrated to show that surrogate PFOS degrades into PFCAs which continued to defluorinate to form shorter-chained PFCAs until the compound has been completely degraded. The ability to rapidly degrade PFSAs using a photocatalytic technology comes from coupling the attack with a nucleophile attack. The PFAS is able to both absorb to the SGM and adsorb to the photocatalysis, thus creating a direct transport pathway for free radicals and free hydroxyls to attack the functional 395 group and subsequent C—F chain. With PFOS and PFHxS accounting for the highest concentrations of PFSAs present, the temporary increase in PFOA and PFHxA concentrations, followed by a decrease in concentrations, are consistent with this degradation pathway. PFCAs likely degrade to form shorter-chained PFCAs until defluorination is complete. Additionally, trifluoroacetic acid and significant concentrations of aqueous fluoride were detected in the effluent of the columns, verifying degradation.

Example 3: SGM Characterization

Figure 22:
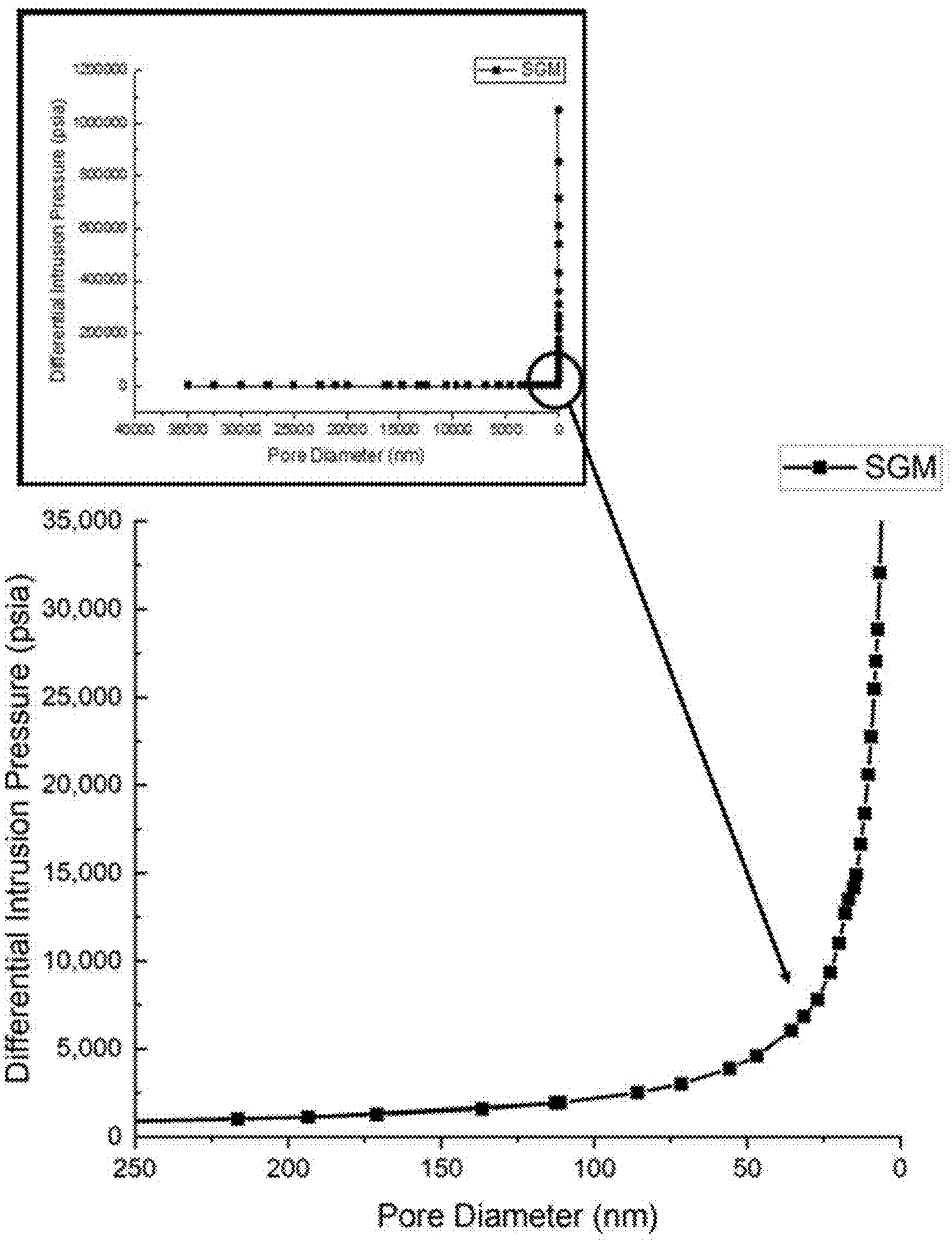
FIG. 22 is a graph of mercury intrusion porosimetery pore size distribution.

Process characterization and discrete particle testing were performed using thermal gravimetric analysis and mercury intrusion porosimetry. A diffusion pore space capable of storing an absorbed solution is observed in the cross-section of SGMs in FIG. 21. To determine the volumetric capacity of the media with corresponding silica content or foaming agents, water absorption testing was performed on the various SGM in accordance with ASTM C128, except that extended saturation time periods of 72 hours were utilized due to the abundance of voids compared to most aggregates. Water absorption is reported to vary from 50% to 65%, which is inversely correlated with increasing silicic acid content and the formation of larger voids during degassing of foaming agent during firing. Diffusion of internal pore solution or desorption is regulated by the continuous nature of pore space, the tortuous nature or interconnectedness of the pores, and any control formed at the surface of the granule that might control flow in and out of the media. The formation and thickness of this interface relative to pore space was quantified through mercury intrusion porosimetry (MIP) which evaluates porosity, pore size distribution, and pore volume by intruding mercury into pore space under pressure. At low pressure, the large pore spaces are filled first and easily while smaller pores require increases in pressure to fill. The Washburn equation governs the intrusion of pore aperture relative to pressure and the results with respect to silica content are presented below in Table 3 and FIG. 22.

TABLE 3

| Pore Distribution Characteristics and Properties | | | | |
|---|---|---|---|---|
| | Silicic Acid Concentration | | | |
| | 5 mg/L | 50 mg/L | 500 mg/L | 1000 mg/L |
| Intrusion Data Summary | | | | |
| Total Intrusion Volume (mL/g) | 0.9984 | 0.8768 | 1.2206 | 1.0791 |
| Total Pore Area (m/g) | 33.152 | 34.260 | 34.450 | 38.723 |
| Median Pore Diameter (Volume, nm) | 750.9 | 1162.6 | 1249.6 | 1014.0 |
| Media Pore Diameter (Area, nm$^2$) | 17.4 | 14.9 | 16.3 | 16.0 |
| Average Pore Diameter (4 V/A, nm) | 120.5 | 102.4 | 141.7 | 111.5 |
| Bulk Density at 0.2 psia (g/mL) | 0.5349 | 0.5981 | 0.4767 | 0.4998 |
| Apparent (skeletal) Density (g/mL) | 1.1478 | 1.2576 | 1.1399 | 1.0849 |
| Porosity (%) | 53.4 | 52.4 | 58.1 | 53.9 |
| Stem Volume Used (%) | 57 | 46 | 61 | 59 |
| Pore Structure Summary | | | | |
| BET Surface Area (m$^2$/g) | 162.3000 | 133.9600 | 129.2300 | 156.9500 |
| Tortuosity Factor | 0.032 | 0.065 | 0.044 | 0.032 |
| Tortuosity | 0.9166 | 1.3234 | 1.1439 | 1.2185 |
| Major Stowe Summary | | | | |
| Interstitial Porosity (%) | 35.0388 | 36.3433 | 28.8441 | 25.9500 |

Figure 23:
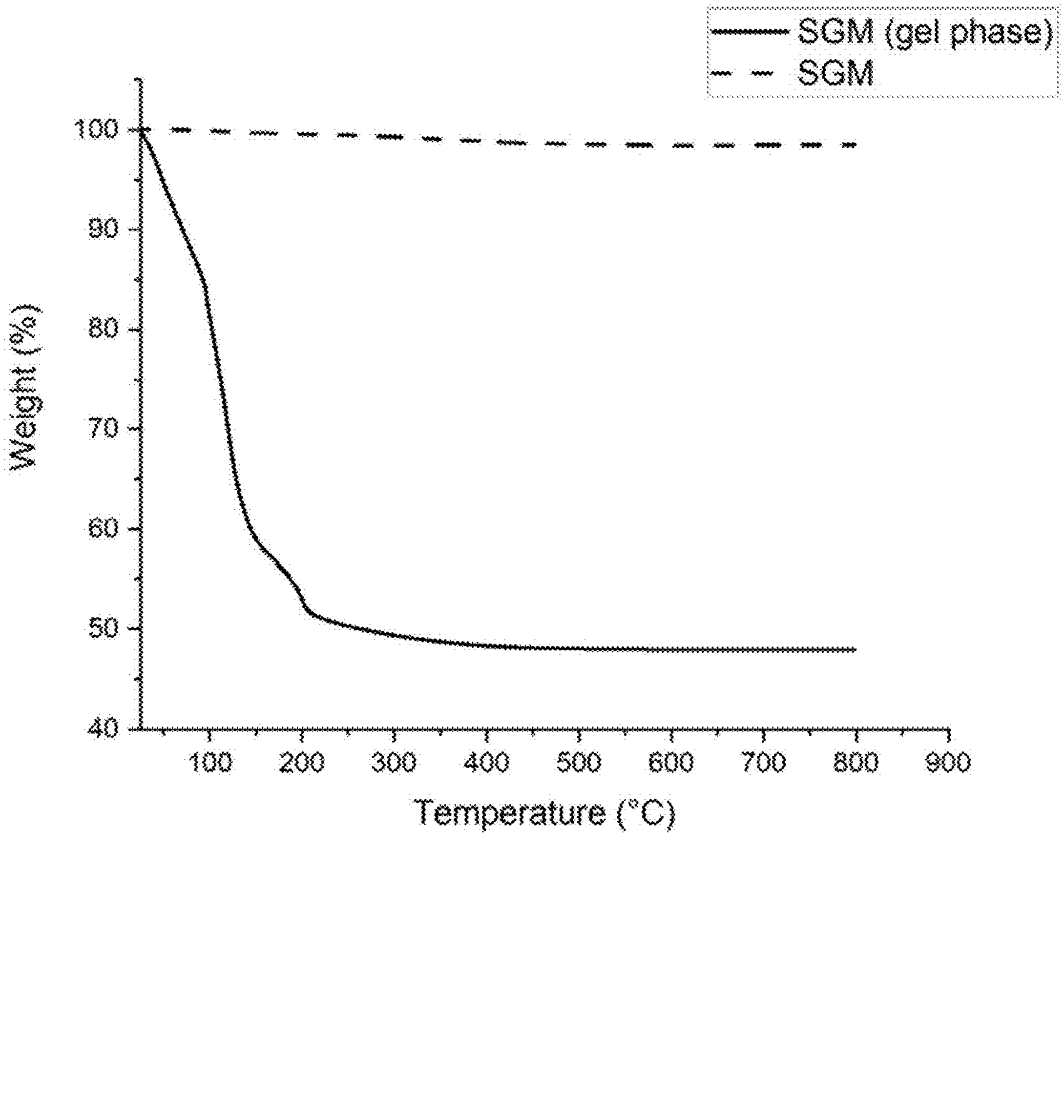
FIG. 23 is a graph of thermal gravimetric analysis on percent weight loss of SGM during firing.

Thermal gravimetric analysis (TGA) was performed on the SGM both before and after the firing process. From 25° C. to 800° C., 50% of the weight of the sol-gel was lost due to the evaporation of the liquid matrix surrounding the cross-linked solid network (FIG. 23). However, the volume was retained, resulting in a lighter substance. The completely synthesized SGM recorded no loss in weight, demonstrating that the media is durable at high temperatures.

Photocatalytic Evaluation of SGM Variations

Figure 24:
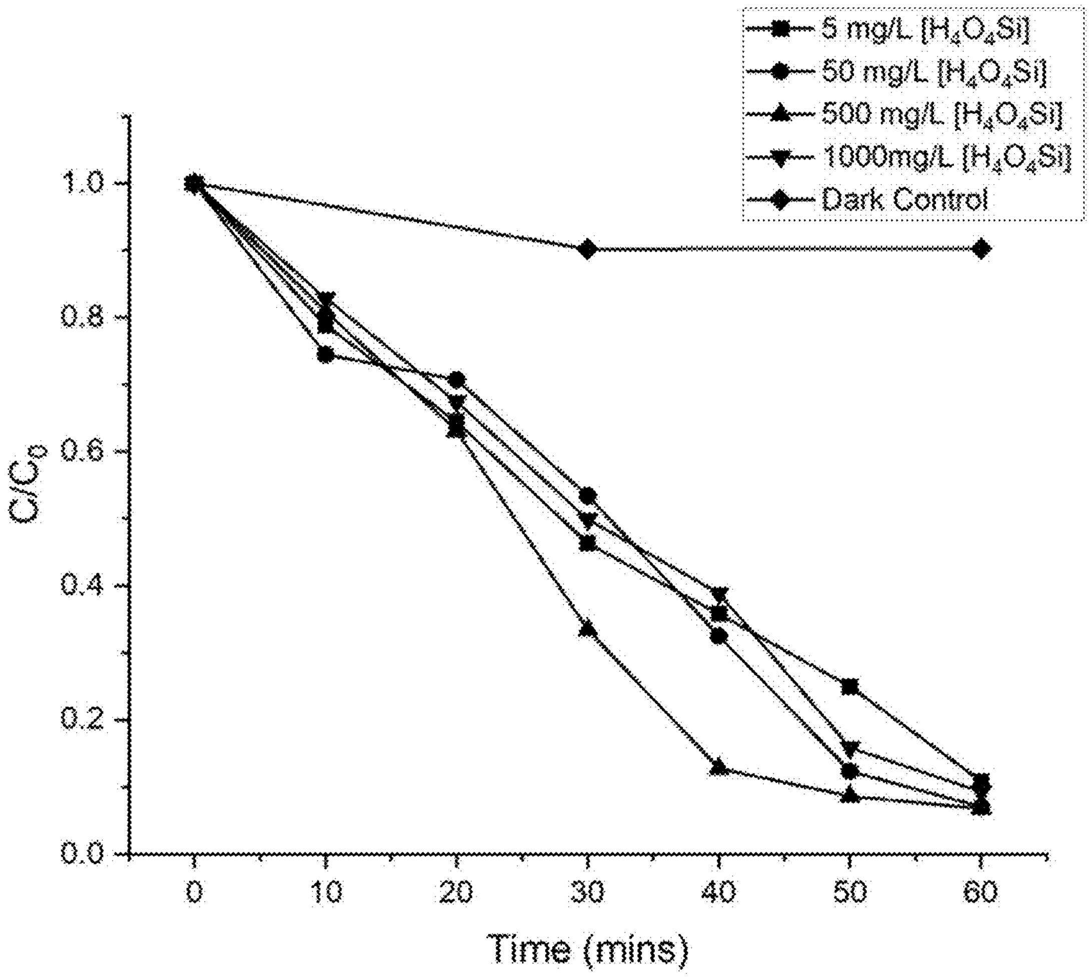
FIG. 24 is a graph of photocatalytic degradation of methylene blue over SGM variations.

Although structural and thermal strengths are important for SGM longevity, the purpose of the SGM is to function as a photocatalytic granular media for water treatment. Photocatalytic reactivity testing was performed on all four variations of SGM utilizing methylene blue and the same reactor setup, as described in the technical approach of Example 1. FIG. 24 depicts some minimally observed adsorption occurs from 0-30 minutes as the dye wets the surface and the pore space fills, however, there is no change from 30-60 minutes. The primary mechanism for methylene blue reductions by SGM is therefore photocatalysis. While similar degradation percentages were obtained from all treated SGM variations at 60 minutes, the 500 mg/L silicic acid SGM had the quickest path to degradation and resulted in 90.6% reduction in color, while the majority of removal (84.6%) was achieved after 40 minutes.

Figure 25:
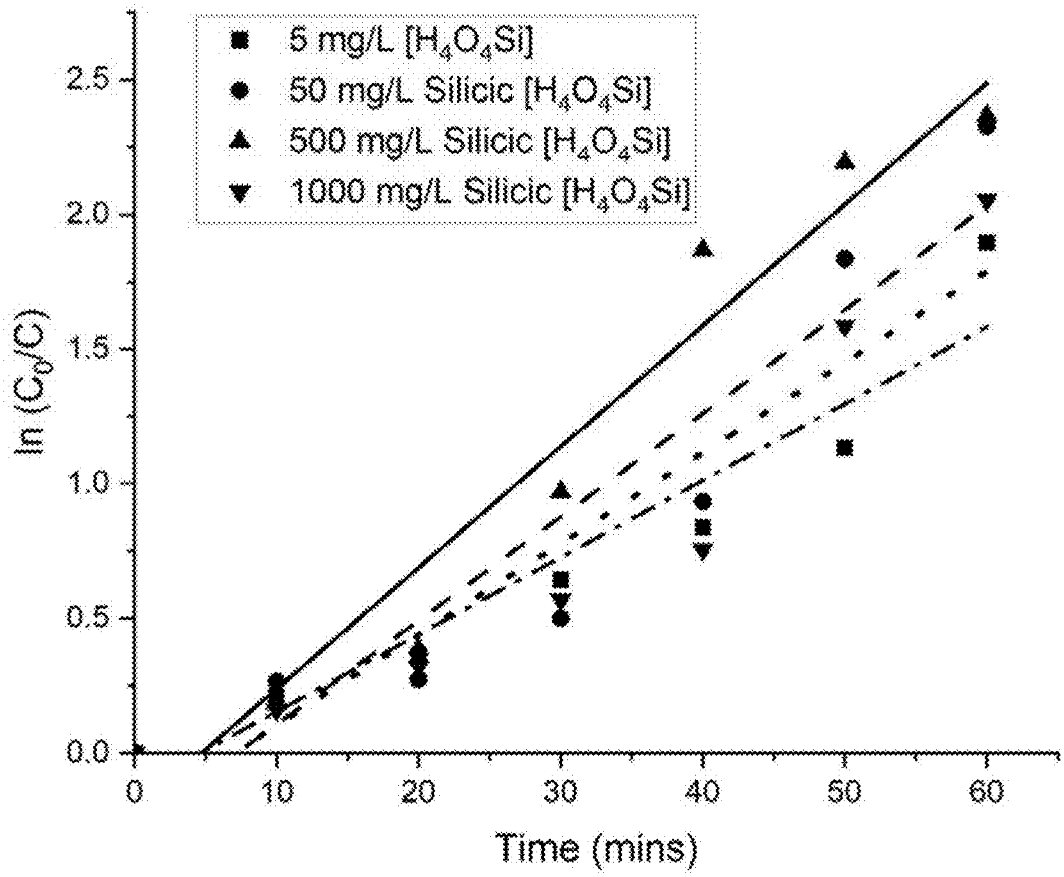
FIG. 25 is a graph of reaction kinetics of methylene blue over various SGM.

Photocatalytic degradation of methylene blue in SGM is shown to follow first-order degradation kinetics. FIG. 25 depicts the linear trend when timed discrete aliquots are plotted against ln(C0/C). The variance from the fitted line is theorized to be from minimal evaporation of the dye during treatment causing some concentration or from pH influence.

Figure 26A:
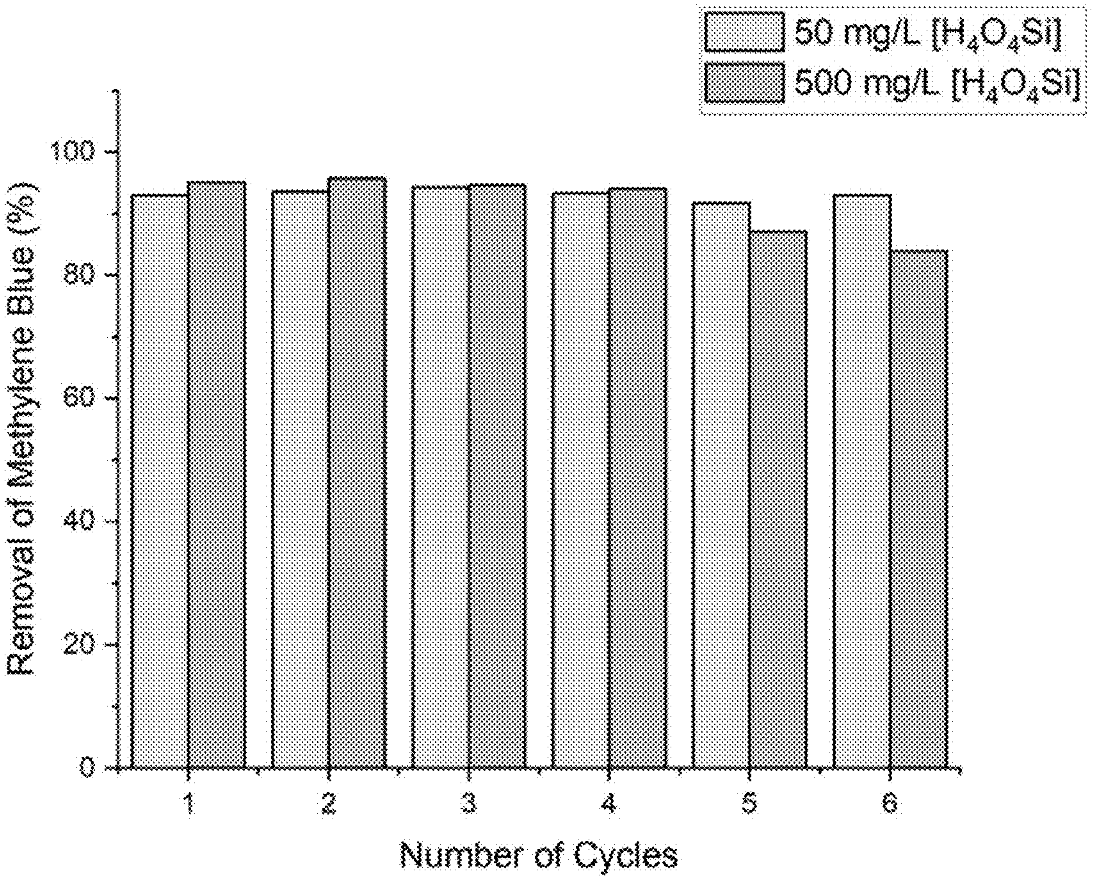
FIG. 26A is a bar graph of 10 mg/L methylene blue degradation by SGM.
Figure 26B:
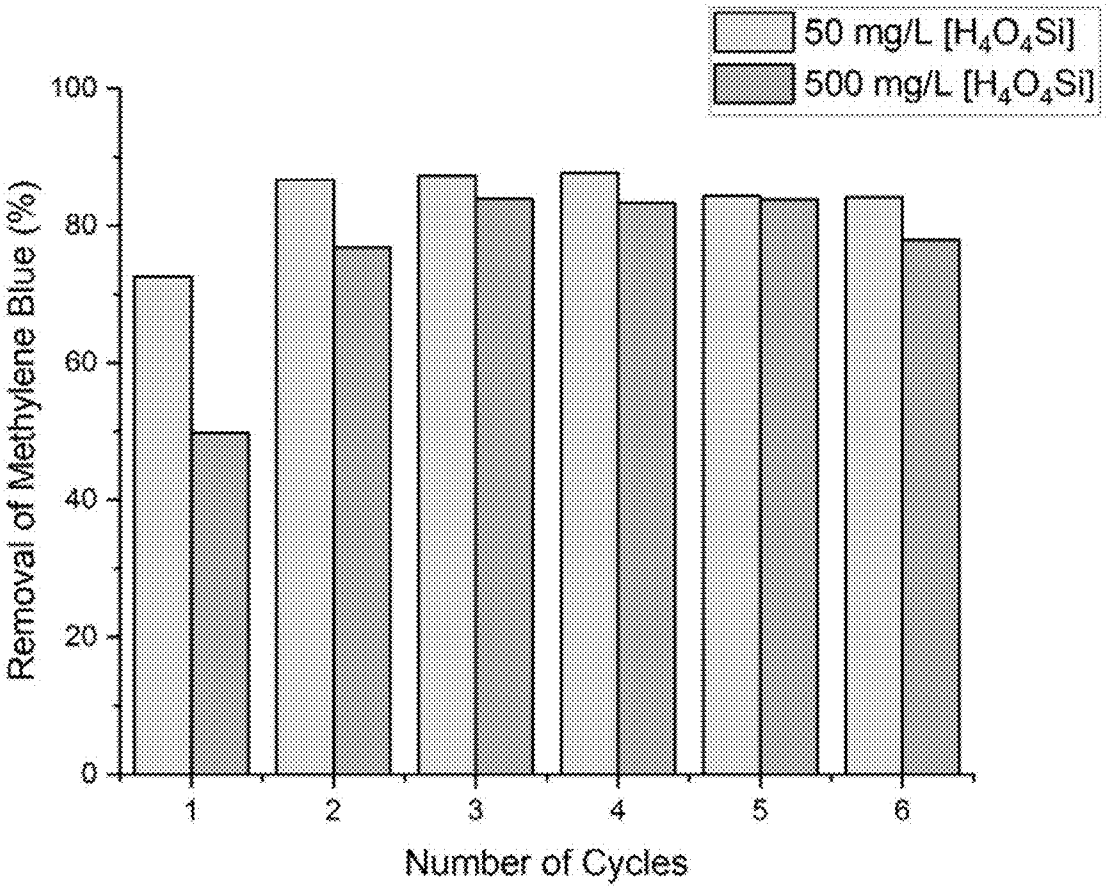
FIG. 26B is a bar graph of 20 mg/L methylene blue degradation by SGM.

To show both the photocatalytic sustainability and longevity of the SGM, cyclic testing of two variations of the SGM was performed with methylene blue. The initial reactor volume of 35 mL was replaced with new solution 10 mg/L methylene blue every 60 minutes (FIG. 26A). Cyclic testing with 20 mg/L methylene blue is also shown in FIG. 26B.

Hydroxyl Diffusivity

Figure 27:
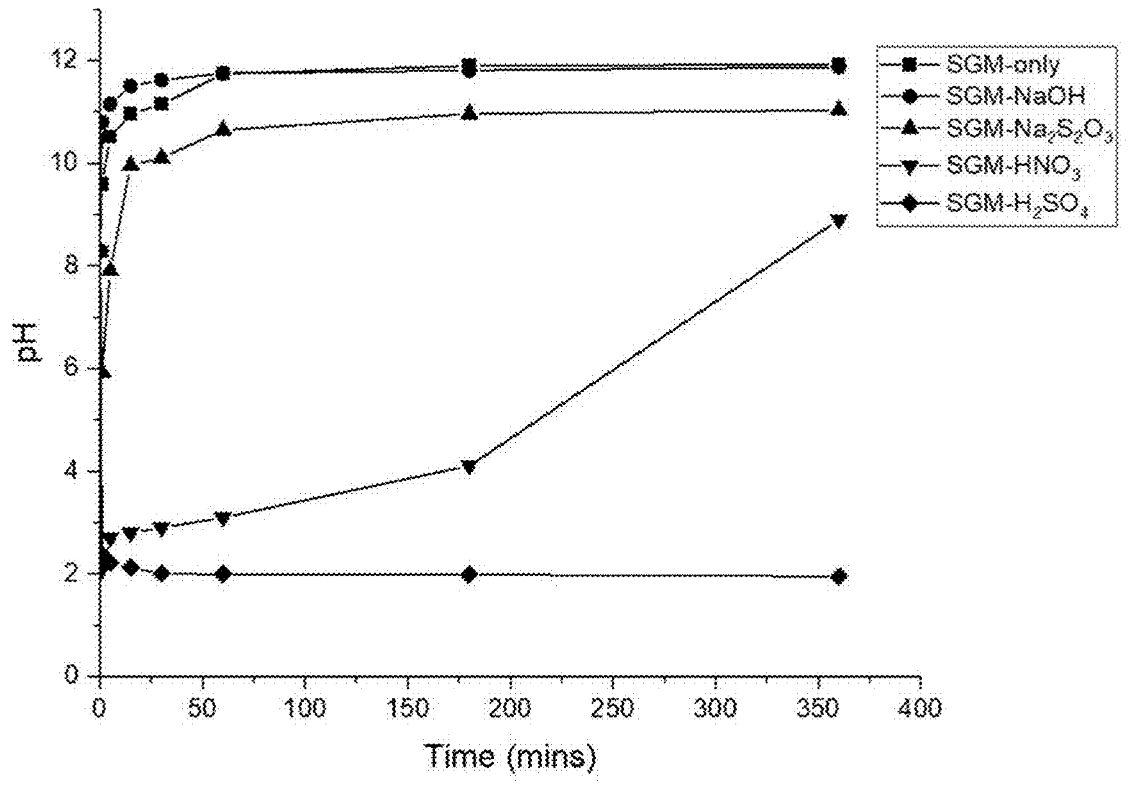
FIG. 27 is a graph of pH over time of SGM with various amendments added.

Hydroxyl diffusivity was measured for the media with various amendment types. Hydroxyl diffusion is important for a dual nucleophile and photocatalytic attack of PFAS and to demonstrate the viability of the material to perform both attacks in a coupled manner. Two nucleophiles, sodium thiosulfate (weak) and sodium hydroxide (strong), were utilized for the dual attack. The coupled degradation mechanisms allow for rapid cleaving of the sulfate functional group from the rest of the C—F chained backbone. In addition, nitric acid and sulfuric acid amendments were examined for diffusivity because elevated pH hinders the degradation of PFCAs due to repulsion of anionic PFAS and the photocatalyst. pH diffusion tests were performed over 6 hours; results are depicted in FIG. 27. The data indicates that diffusion of amendments from the pore space into free solution various from rapid in the case of the sulfuric amended SGM to moderate in the basic amended SGM. What is important to note is that the hydroxyls present in the media during from the foaming process remain in the media even with the nitric acid amendment. In the nitric amendment trial the strong basic conditions from the foaming agent (NaOH) start to raise pH from 3 to 8 S/U after 60 minutes.

Example 4: SGM Synthesis with Bismuth Trioxide

This Example uses a similar process to the synthesis of an SGM with titanium dioxide. However, because of the density of bismuth trioxide, the photocatalyst is first dissolved in nitric acid before a silica acid mixture and alkoxide precursor (tetraethyl orthosilicate) are added. In general, the process requires adding 100 mL $HNO_3$, 1-10 g $Bi_2O_3$, 0.1-0.2 g $SiO_2$, 50 mL water, and 150 mL TEOS.

Figure 28:
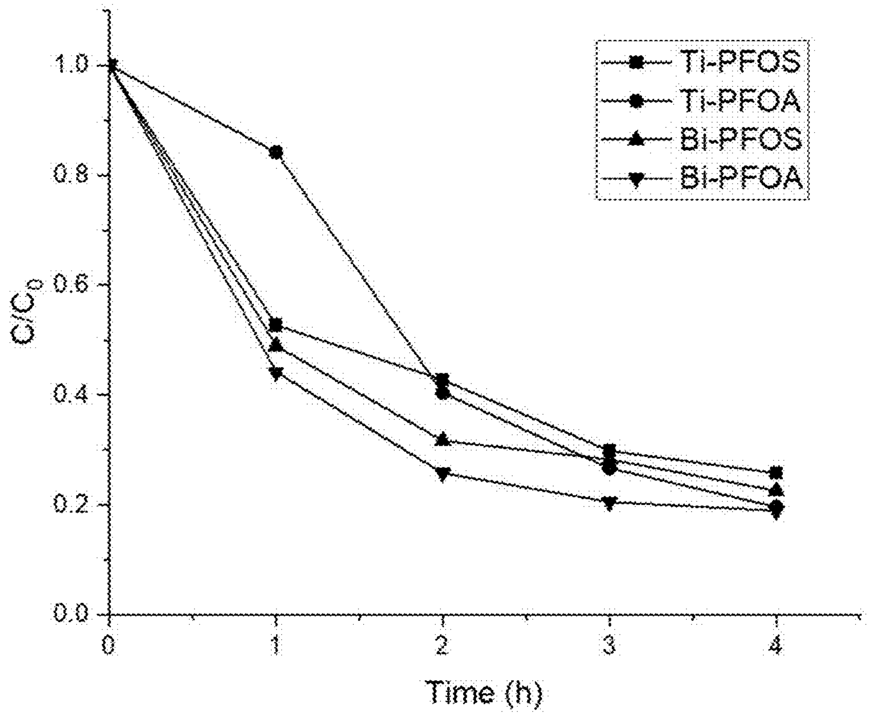
FIG. 28 is a graph of Ti-SGM versus Bi-SGM degradation of PFOS and PFOA in mini-column reactors.
Figure 29:
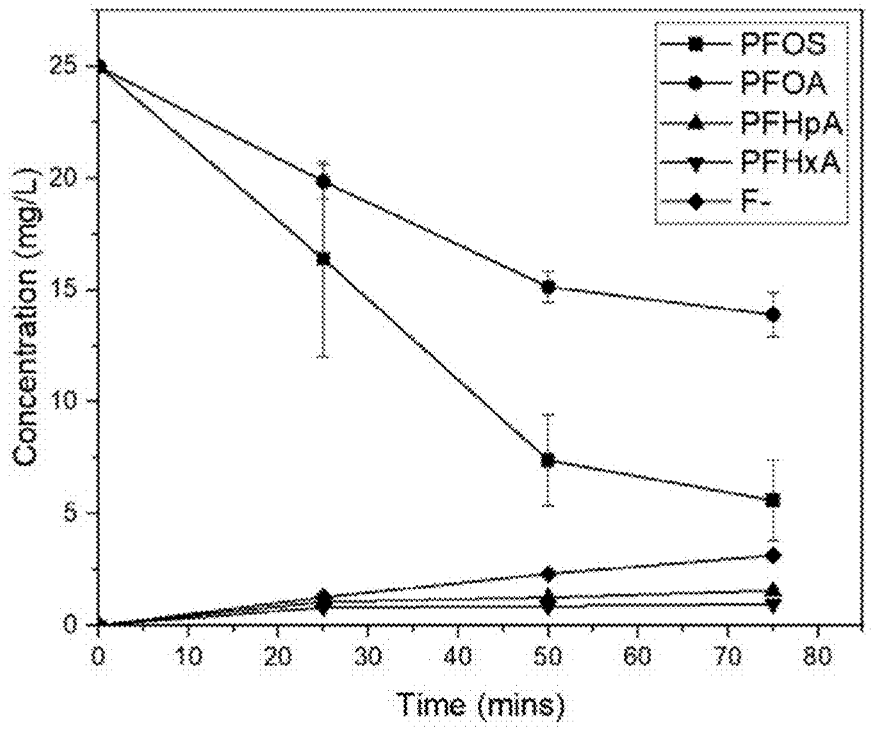
FIG. 29 is a graph of the degradation of PFOS and PFOA over Bi-SGM with byproduct recovery.
Figure 30:
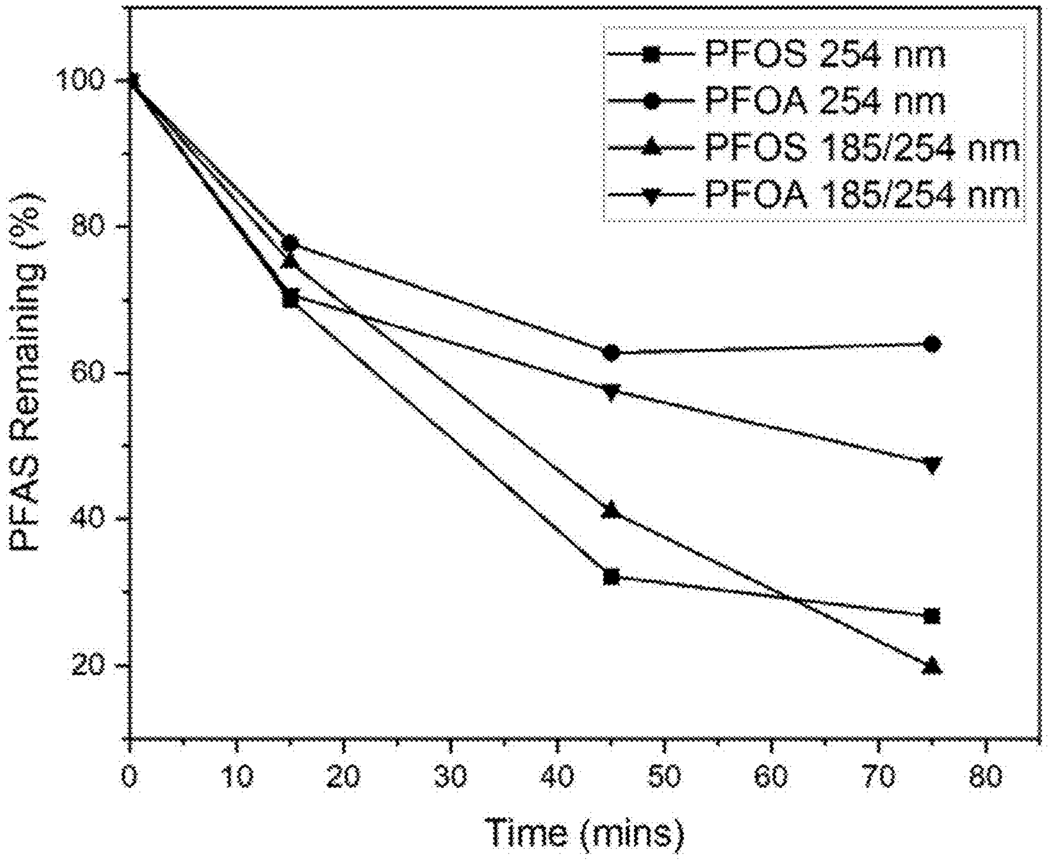
FIG. 30 is a graph of the degradation of PFOS and PFOA over Ti-SGM under 254 nm irradiation and 185/254 nm irradiation.

Once the gel is completely polymerized in a cross-linked structure, sodium hydroxide is added as a foaming agent. It is theorized that the form of bismuth at this point is most likely bismuth hydroxide ($Bi_3(OH)_3$). Bi-SGM can be used in-line with Ti-SGM or as a replacement. $Bi_3O_3$ (2.1-2.8 eV) has a lower band gap than $TiO_2$ (3.2-3.5 eV), thus having the potential to have an increased oxidation power. Bi-SGM has been validated in batch reactors, mini-column reactors, and submerged lamp reactors. Bi-SGM has been show to defluorinate a variety or per- and poly-fluoroalkyl substances at an irradiation wavelength of 254 nm. FIG. 28 shows the degradation of 25 mg/L PFOS and 25 mg/L POA over four hours, with 10% sulfuric acid addition, comparing Ti-SGM and Bi-SGM. FIG. 29 shows the degradation of PFOS and PFOA with Bi-SGM alone, with 10% sulfuric acid addition and byproduct recovery, using a 57-watt lamp. Further, FIG. 30 demonstrates that the degradation rate of PFAS can be improved when ozone generating lamps (185/254 nm) are used versus non-ozone lamps (254 nm) by comparing degradation of PFOS and PFOA over Ti-SGM (with 10% sulfuric acid addition) under irradiation with both using a 21-watt lamp.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above materials, processes, and methods without departing from the scope of the invention, it is intended that all matter contained in the above description and shown in the accompanying drawings shall be interpreted as illustrative and not in a limiting sense.

The invention claimed is:

1. A photocatalytic silica-based granular media for degrading organic compounds formed from a three-dimensional polymer and comprising cross-linked silicon-oxygen (Si—O—Si) bonds formed through hydrolysis of an alkoxide precursor and a photocatalyst, wherein the cross-linked silicon-oxygen bonds of the polymer immobilize the photocatalyst, the media having a porosity of at least 30%.

2. The media claim 1, wherein the cross-linked polymer has been fired to form the silica-based granular media.

3. A process for producing a photocatalytic silica-based granular media of claim 1, the process comprising:

introducing a photocatalyst to an alkoxide precursor with heat and/or agitation to form a photocatalyst mixture;

hydrolyzing and condensing the photocatalyst mixture until a polymer gel is formed;

adding a foaming agent to create a porosity within the granular media; and removing excess solution to fuse the gel into the granular media.

4. The media of claim 1, wherein the silica present within the silicon-oxygen bonds is provided by silicic acid, the alkoxide precursor, another form of silica, or a combination thereof.

5. The media of claim 1, wherein the porosity is formed by a foaming agent.

6. The media of claim 5, wherein the foaming agent comprises a hydroxyl source.

7. A photocatalytic silica-based granular media for degrading organic compounds formed from a three-dimensional polymer and comprising cross-linked silicon-oxygen (Si—O—Si) bonds formed through hydrolysis of an alkoxide precursor and a photocatalyst, wherein the media has a porosity of from about 40% to about 90%.

8. The media of claim 7, wherein the media has a tortuosity of from about 0.5 to about 1.5.

9. The media of claim 7, wherein the media has an overall size distribution of from about 1 mm to about 30 mm.

10. The media of claim 7, wherein the media internal pore size distribution is from about 100 nm to about 50,000 nm.

11. The media of claim 1, wherein the alkoxide precursor comprises tetraethyl orthosilicate (TEOS), tetramethyl orthosilicate (TMOS), titanium isopropoxide (TTIP), or a combination thereof.

12. The media of claim 1, wherein the alkoxide precursor comprises a silica-containing alkoxide precursor.

13. The media of claim 1, wherein at least a portion of the silica present within the silicon-oxygen bonds is provided by silicic acid or another form of silica.

14. The media of claim 1, wherein the pores of the media have been loaded with nitric acid, sulfuric acid, hydrochloric acid, potassium hydroxide, sodium hydroxide, calcium hydroxide, sodium thiosulfate, or a combination thereof.

15. The media of claim 1, wherein the photocatalyst comprises a metal oxide.

16. The media of claim 15, wherein the metal oxide comprises $TiO_2$, $Ti_nO_{2n-1}$, wherein n is an integer, $Bi_2O_3$, $In_2O_3$, $Ga_2O_3$, $Sb_2O_3$, ZnO, or a combination thereof.

17. The media of claim 16, wherein the photocatalyst further comprises a dopant comprising Au, Ag, Al, C, Pt, Si, W, or a combination thereof.

18. A method for degrading one or more organic compounds, the method comprising:

introducing the one or more organic compounds to the silica-based granular media of claim 1; and irradiating the composition with electromagnetic radiation.

19. A reactor to degrade one or more organic compounds, the reactor comprising:

an inlet to allow the passage of an incoming stream containing the one or more organic compounds;

at least one treatment area, wherein the treatment area is packed with the silica-based granular media of claim 1;

at least one UV light source exposed to the treatment area; and an outlet to allow the passage of an outgoing waste stream at least partially depleted of the one or more organic compounds.

20. The media of claim 1, wherein the porosity is measured by mercury intrusion porosimetry (MIP).

* * * * *